United States Patent [19]
Jia

[11] Patent Number: 5,628,517
[45] Date of Patent: May 13, 1997

[54] CONTRACTING/EXPANDING SELF-SEALING CRYOGENIC TUBE SEALS

[75] Inventor: Lin X. Jia, Upton, N.Y.

[73] Assignee: Florida Atlantic University, Boca Raton, Fla.

[21] Appl. No.: 71,418

[22] Filed: Jun. 1, 1993

[51] Int. Cl.$^6$ ............................................. F16J 15/08
[52] U.S. Cl. .................. 277/26; 277/170; 277/207 A; 277/236; 285/917
[58] Field of Search ........................ 277/26, 27, 170, 277/207 A, 236; 285/41, 187, 917, 918, 369

[56] References Cited

U.S. PATENT DOCUMENTS

| | | | |
|---|---|---|---|
| 2,766,829 | 10/1956 | Watts et al. | 285/140 X |
| 3,056,615 | 10/1962 | Breitenstein | 285/187 |
| 3,093,398 | 6/1963 | Fawcett et al. | 285/187 X |
| 3,210,098 | 10/1965 | Watts | 285/187 X |
| 3,301,577 | 1/1967 | Latham | 285/187 |
| 3,411,812 | 11/1968 | Prince et al. | 285/187 |
| 3,632,143 | 1/1972 | Lessmann | 285/187 |
| 3,775,989 | 12/1973 | Mursinna et al. | 62/55 |
| 3,929,358 | 12/1975 | Eckhardt | 285/353 |
| 4,072,245 | 2/1978 | Sloan, Jr. | 277/206 R |
| 4,349,203 | 9/1982 | Schülke | 285/187 |
| 4,491,347 | 1/1985 | Gustafson | 285/47 |
| 4,659,116 | 4/1987 | Cameron | 285/27 |
| 4,813,342 | 3/1989 | Schneider et al. | 277/26 |
| 4,854,597 | 8/1989 | Leigh | 277/207 A |
| 4,865,331 | 9/1989 | Porter | 277/26 |
| 5,083,821 | 1/1992 | Friend | 285/355 |
| 5,355,908 | 10/1994 | Berger et al. | 285/917 |

*Primary Examiner*—William A. Cuchlinski, Jr.
*Assistant Examiner*—John L. Beres
*Attorney, Agent, or Firm*—Saliwanchik, Lloyd & Saliwanchik

[57] ABSTRACT

Contracting/expanding self-sealing cryogenic tube seals are disclosed which use the different properties of thermal contraction and expansion of selected dissimilar materials in accord with certain design criteria to yield self-tightening seals via sloped-surface sealing. The seals of the subject invention are reusable, simple to assemble, and adaptable to a wide variety of cryogenic applications.

15 Claims, 12 Drawing Sheets

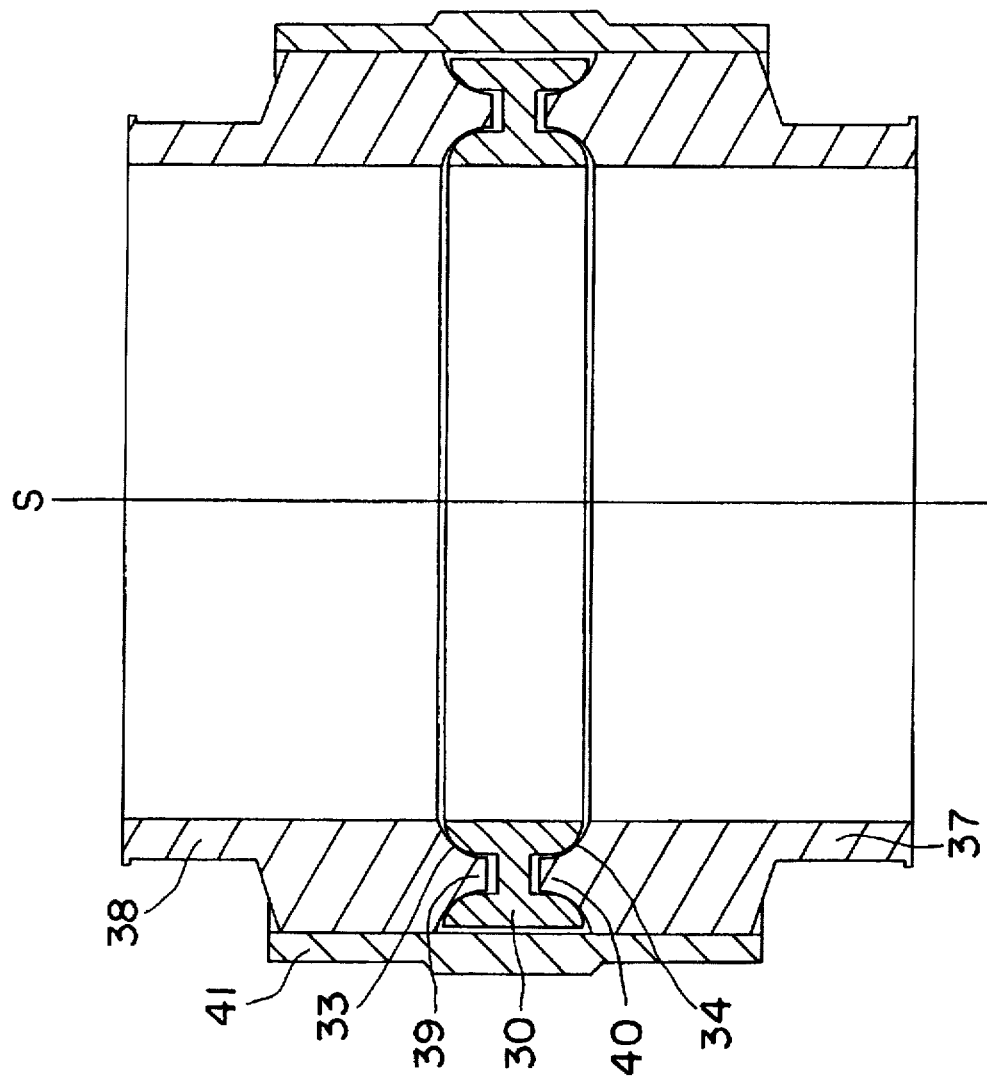

ic tube seals

CONTRACTING/EXPANDING SELF-SEALING CRYOGENIC TUBE SEALS

The subject invention was made with government support under a research project supported by NASA-Kennedy Space Center and under Contract No. NAS10-11569 and Research Grant No. NAG10-0083. The government has certain rights in this invention.

BACKGROUND OF THE INVENTION

The rigorous conditions of very low operating temperatures coupled with high pressure impose extreme difficulties for controlling cryogen leakage from in-line tube fittings. The KC126 fitting, which has been used by NASA in the fuel lines of the space shuttle, has been found to leak. We have shown that the KC126 fitting leaks at 205K, and at 77K has a leak mass flux of $1.28 \times 10^{-3}$ kg/min. See also Moore, Z., D. Capellin, A. Rodriguez, J. England (1988) "LH$_2$ TSM Leakage Problem," Interim Report: DM-MED-4, NASA, J.F.K. Space Center. Accordingly, there exists a need for an improved design of cryogenic seal for tube fittings such as those used in the space shuttle, and which is reusable and seals under extremes of low temperature and high pressure. Such a seal would have wide application in the cryogenic art.

The problem of sealing a joint between two interconnecting pieces that are designed to operate at cryogenic temperatures has been previously recognized. In part, this problem was addressed in U.S. Pat. No. 3,630,533, issued Dec. 28, 1971 to Butler et al., entitled "Dynamic Seal for Cryogenic Fluids." An additional problem addressed by Butler et al. is the high temperature sealing problem, which influenced Butler et al.'s design. Butler et al. used a circular sealing ring made from a fluorocarbon plastic material to seal two metal tubular couplings. The sealing ring is pressed onto a radially outward surface of one of the metal couplings. The sealing ring has a radially inward protruding annular rib which elastically and inelastically deforms as the sealing ting is pressed into place. This arrangement effects a sealing engagement between the sealing ting and the metal coupling at temperatures reported to be within the range of 70° F. to −423° F. At normal temperatures, the inner surface of the sealing ring is held in sealing engagement by the elastic preload induced by the initial interference press-fit and deformation of the protruding annular rib. In addition to the preload, a circumferential tension is generated in the sealing ring as the temperature decreases, because the sealing ring's coefficient of thermal expansion and contraction is greater than the coefficient of thermal expansion and contraction of the metal couplings. Thus, because of the differences in the expansion coefficients of the sealing ring and the metal coupling that it is pressed onto, the sealing engagement between these members of two different materials becomes tighter as the temperature decreases. However, in Butler et al.'s design, each time two metal tubular couplings are sealed together, the complex plastic sealing ring must be inelastically deformed into a particular configuration. Since the sealing ring is irreparably deformed by its installation, after separation of the two couplings for maintenance or other reasons, it is necessary to replace the sealing ring before the two couplings can be rejoined. Such a "use once and throw away" approach is wasteful, ultimately expensive, and troublesome if a replacement ring is not readily available. A coupling between two members which can be joined and separated, without requiring a new sealing ring each time, is needed.

BRIEF SUMMARY OF THE INVENTION

The subject invention, contracting/expanding self-sealing cryogenic tube seals, are thermal-contraction controlled-action sealing and gripping devices which utilize the differences of the thermal contraction of selected dissimilar materials in a specially designed and composed structure to self-tighten the seal via sloped-surface sealing between coupled members as the temperature decreases from ambient temperature. "Sloped-surface sealing" means that the contact points creating the seal are not the result of contact of parallel surfaces. In one preferred embodiment, the cooling process causes the contraction of a sealing spacer, further gripping the member ends, and causes the contraction of a housing nut, further forcing the coupling member ends together, thereby taking advantage of sloped-surface sealing in a novel way and preventing leakage of the flowing cryogen.

The contracting/expanding self-sealing cryogenic tube seals are leak-free from room temperature to cryogenic temperatures as low as that of liquid helium and, unlike anything known in the art, provide easily remountable tube connections for high pressure and low temperature applications.

The contracting/expanding self-sealing cryogenic tube seal is a general purpose cryogenic tube seal. It provides reliable leak-free connections for the low/high pressure and low temperature working conditions in cryogenic applications. It can be easily applied to various cryogenic fittings and valves. Some basic advantages of contracting self-sealing cryogenic fittings are summarized as follows:

1. Applicable to any low temperatures and temperature cycling.
2. Works on most common magnetic/non-magnetic tube materials.
3. Seals on machined surfaces.
4. Does not reduce the flow area.
5. Works on vacuum as well as low or high pressures.
6. Simple in structure for production and handling.
7. Easy to use, similar to the standard SAE fittings.
8. Easy to assemble and disassemble.
9. Ability to reuse without special maintenance or replacement.
10. Not sensitive to the applied coupling torques.
11. Not sensitive to the moment from other components.
12. Not corrosive for common cryogen.
13. Applicable to most cryogenic tube connections.

Design criteria for contracting/expanding self-sealing cryogenic (CESSC) tube seals are taught which must be applied in accord with the subject invention, and which depend on the properties of selected materials as well as the configuration of the seal. These criteria, illustrated by the following examples, enable the construction by means well known in the art of a tremendous number of varying embodiments, all of which are based on the novel sloped-sealing concepts taught herein, as will be readily apparent to the skilled artisan.

BRIEF DESCRIPTION OF THE DRAWINGS

FIG. 9 depicts an H-shaped spacer of the contracting/expanding self-sealing cryogenic tube seal wherein the sloped surface sealing is accomplished via contact of curved surfaces.

Table 1

DETAILED DISCLOSURE OF THE INVENTION

Following are examples which illustrate procedures, including the best mode, for practicing the invention. These examples should not be construed as limiting.

EXAMPLE 1

A Preferred Embodiment

Figure 1:
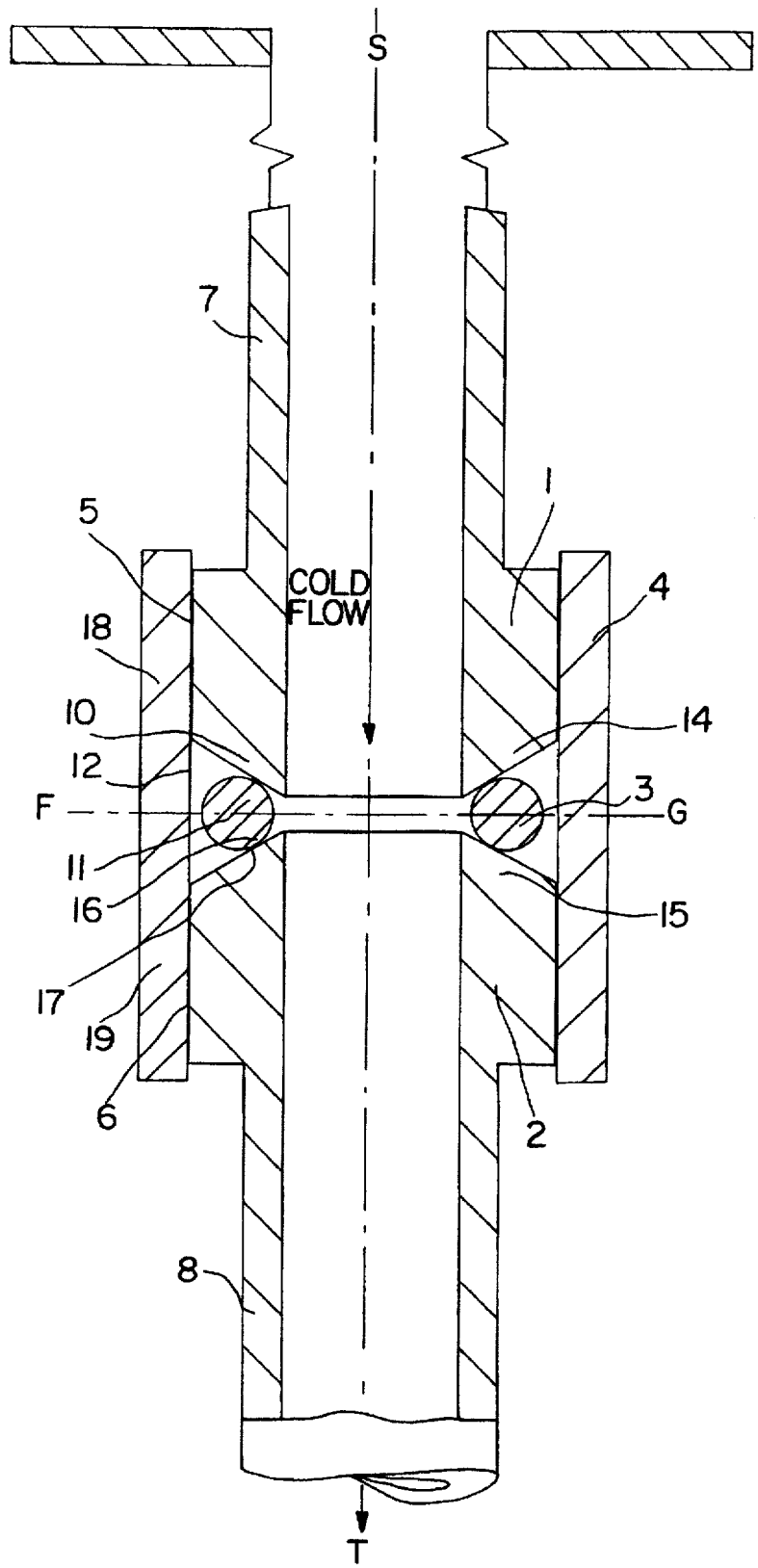
FIG. 1 depicts a longitudinal section through a preferred embodiment of a contracting self-sealing cryogenic tube seal.

In a preferred embodiment, as depicted in FIG. 1, the contracting self-sealing cryogenic tube seal consists of four basic components: metal coupling members 1 and 2, each having a male an-flare tube end 14 and 15, respectively, an O-ring spacer 3, and a housing nut 4.. Housing nut 4 comprises internal threads 13 for threaded engagement with external threads 5 and 6 on coupling members 1 and 2, respectively. The O-ring spacer 3 rests between two male an-flare coupling members 1 and 2.

Various parts of contracting self-sealing cryogenic tube seals are made of dissimilar solid bar metals, thereby taking advantage of their different coefficients of thermal contraction. The materials for O-ring spacer 3 and housing nut 4 have higher values of the coefficient of thermal contraction than does the material used for coupling members 1 and 2. In the preferred embodiment, the components are axisymmetric (symmetric about an axis).

Assembly of the contracting self-sealing cryogenic tube seal depicted in FIG. 1 is a simple matter of engaging housing nut 4 with coupling member 1 until the an-flare tube end 14 of coupling member 1 is positioned approximately in the middle of housing nut 4, proximal to the lateral plane represented by segment FG. O-ring spacer 3 is then inserted into housing nut 4 until it contacts an-flare tube end 14 of coupling member 1. Coupling member 2 is then engaged into housing nut 4 until an-flare tube end 15 is secured against O-ring spacer 3. The sloped surface of the an-flare tube ends allows for contraction of the spacer while ensuring that a tight seal is maintained.

In operation, cryogenic fluid begins to flow through the contracting self-sealing cryogenic tube fitting along longitudinal axis ST as depicted in FIG. 1. For ease of discussion, movement toward position S will be referred to as "upward" and movement toward position T will be referred to as "downward;" movement toward axis ST will be referred to as "inward" and movement away from axis ST will be referred to as "outward." As the cryogenic fluid flows, the temperature of all parts of the contracting self-sealing cryogenic tube seal begins to decrease. Accordingly, the various parts of the tube seal shrink in size. Contact portion 10 at tube end 14 tends to shrink upward and inward. Contact portion 11 at O-ring spacer 3 tends to shrink downward and inward. That portion 18 of housing nut 4, which is depicted above lateral plane FG, tends to shrink downward and inward, while housing nut portion 19, below plane FG, tends to shrink upward and inward. Because O-ring spacer 3 and housing nut 4 are made of materials having a larger coefficient of thermal contraction than are coupling members 1 and 2 (and thus tube ends 14 and 15), the inward shrinkage of O-ring spacer 3 tends to cause it to press even more tightly against tube ends 14 and 15. Similarly, shrinkage of housing nut 4 tends to force tube ends 14 and 15 toward each other, as well as providing a tighter engagement of threaded portions 13, 5, and 6. Thus, the effects of thermal contraction will always maintain a leak-free seal in the contracting self-sealing cryogenic seal.

EXAMPLE 2

Some Alternative Embodiments

Figure 2B:
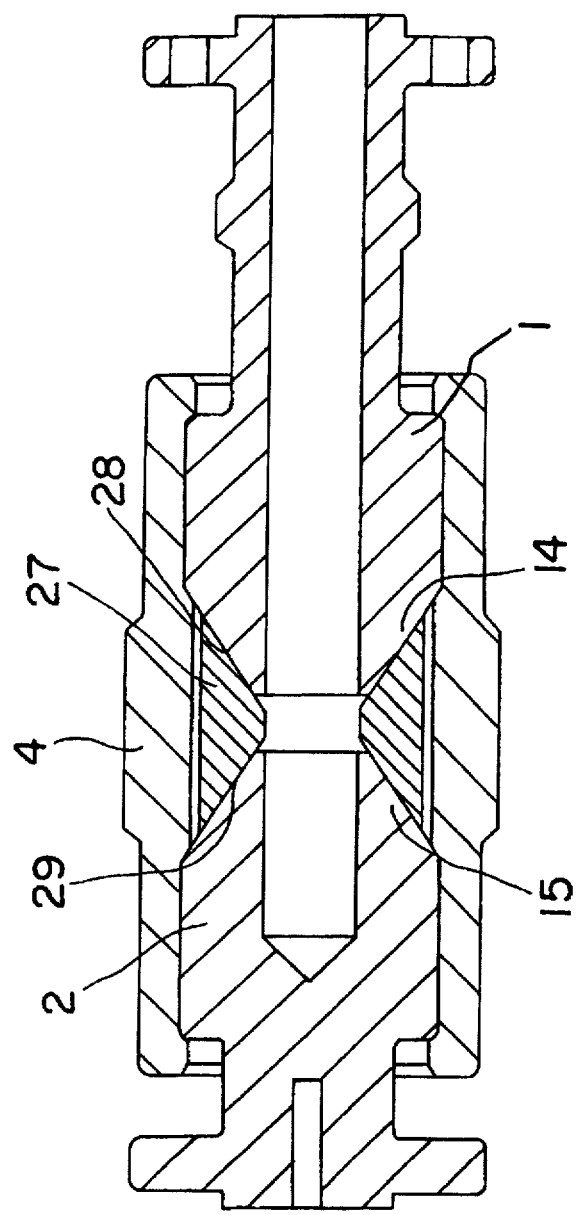
FIG. 2 depicts a longitudinal section through a variation of the embodiment depicted in FIG. 1, wherein the O-ring spacer has been replaced with a modified spacer.
Figure 2A:
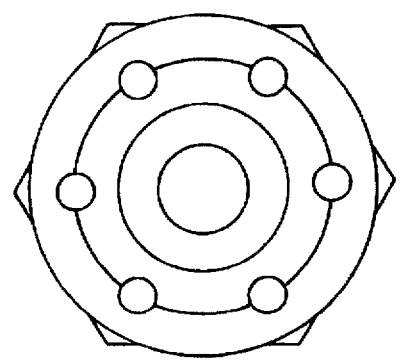
Figure 3B:
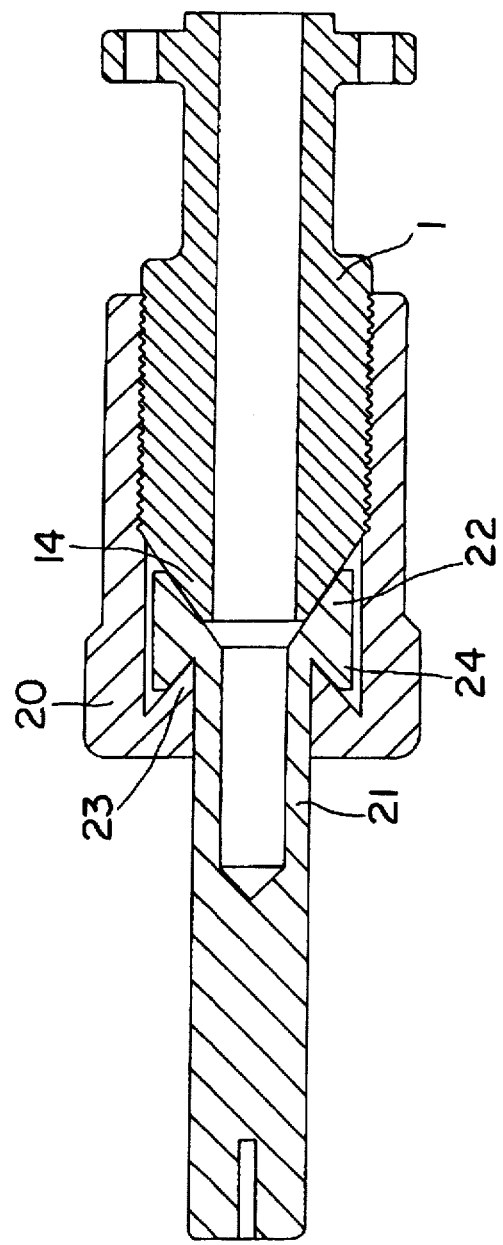
FIG. 3 depicts a longitudinal section through an alternative embodiment of a contracting self-sealing cryogenic tube seal having only three components.
Figure 3A:
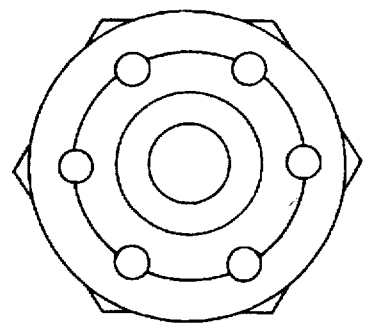
Figure 4B:
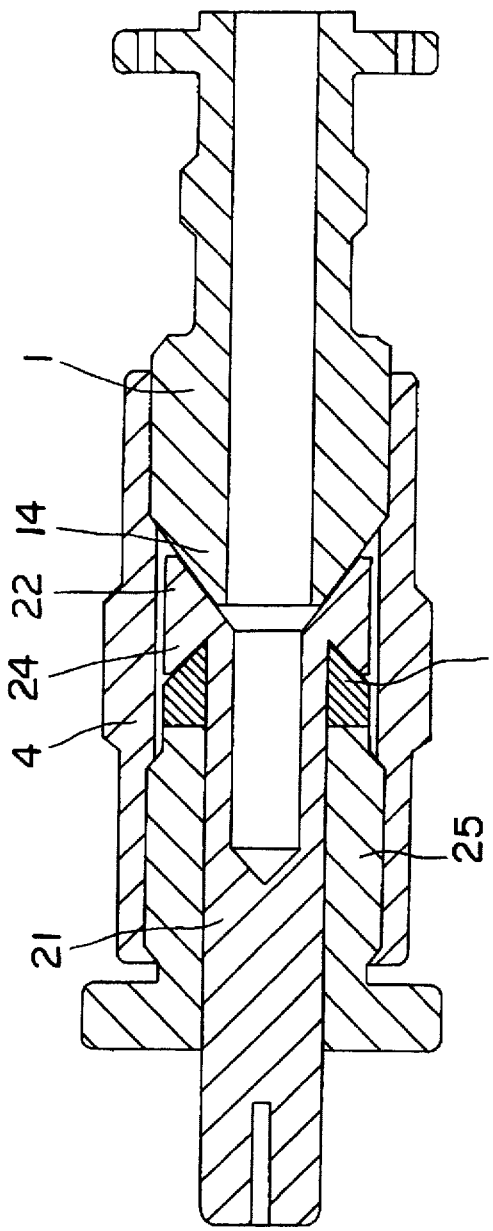
FIG. 4 depicts a longitudinal section through an alternative embodiment of the contracting self-sealing cryogenic tube seal.
Figure 4A:
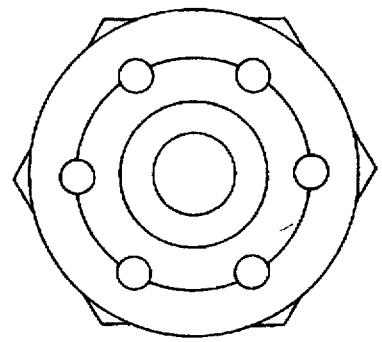

FIGS. 2, 3, and 4 depict exemplary alternative embodiments of the subject invention. To ensure proper sealing, contact surfaces of the components are axisymmetric. FIG. 2 depicts an embodiment similar to that depicted in FIG. 1 except that O-ring spacer 3 has been replaced with a flared spacer 27 having opposed female-flared contact surfaces 28 and 29, each having a complementary shape to tube ends 14 and 15, respectively, such that a tight seal is maintained therebetween in accord with the design criteria described hereinafter.

FIG. 3 depicts coupling member 1 with male an-flare tube end 14, coupling member 21 with female flare tube end 22, and housing nut 20, having a large bore at one end with internal threaded means for receiving and engaging coupling member 1 and a smaller (step down) bore at the other end, which is just large enough to surround coupling member 21, but not large enough to allow female flare tube end 22 to pass through. The internal surface of the step-down end of housing nut 20 defines a circumferential flange 23, radially sloping downward and outward. Housing nut 20 engages coupling member 1, and as housing nut 20 is tightened about coupling member 1, flange 23 engages a circumferential lip 24 on coupling member 21, lip 24 having a complementary slope to that of flange 23 such that contact is maintained between lip 24 and flange 23, and pulls coupling member 21 such that the female flare tube end 22 of coupling member 21 is thereby brought into contact with male an-flare tube end 14 of coupling member 1, similar to the method by which a garden house is brought into contact with a spigot. Secured contact between tube end 14 and tube end 22 is thereby maintained in accord with the disclosed design criteria. To maintain the sloped-surface seal of this embodiment leak-free at cryogenic temperatures, coupling member 21 and housing nut 20 are made of materials having a larger coefficient of thermal expansion than the material of coupling member 1, all in accord with the design criteria. For example, coupling member 21 and housing nut 20 may be made of copper, if coupling member 1 is stainless steel.

The embodiment depicted in FIG. 4 combines features of the embodiments depicted in FIGS. 1 and 3. Housing nut 4 is engaged with coupling member 1 until the an-flare tube end 14 of coupling member 1 is positioned approximately in the middle of housing nut 4. Housing nut 4 then engages collar 25, which has external threaded means for being engaged and secured by the internal threaded means of housing nut 4, and which also has a wedge end 26 which engages lip 24 on coupling member 21 and forces female flare tube end :12 into secured contact with male an-flare tube end 14. Thus, it can be seen that the collar and wedge component of this embodiment can be used with housing nut 4 to effectively replace the flange 23 and small bore end of housing nut 20 of the embodiment depicted in FIG. 3. To maintain the sloped-surface seal of this embodiment leak-free at cryogenic temperatures, collar 25 (having wedge end 26), as well as coupling member 1, are made of materials having a smaller coefficient of thermal expression than the material of housing nut 4 and coupling member 21 (having lip 24).

EXAMPLE 3

Design Criteria of Contracting/Expanding Self-Sealing Cryogenic Seals

According to the theory of Gas Dynamics and the linear analysis of thermal contraction, some criteria for the design of contracting/expanding self-sealing cryogenic seals are given below:

(1) Design criteria for two components—tube and spacer:

$$\alpha < \cos^{-1}\left\{ \left[ \gamma_o + \left( \frac{\gamma_o - 1}{2\beta} \right)^2 \right]^{1/2} - \frac{\gamma_o - 1}{2\beta} \right\}$$

$$\beta < \frac{\gamma_o - 1}{\frac{\gamma_o}{\cos(\alpha)} - \cos(\alpha)}, \gamma_o > \frac{1 - \beta\cos(\alpha)}{1 - \frac{\beta}{\cos(\alpha)}}$$

(2) Design criteria for three components—housing nut, tube-end, and spacer:

$$\gamma_o(T) > \frac{C_1(T)}{C_2}$$

where $$C_1(T) = \sin\left[\alpha + 0\tan^{-1}\left(\frac{1 - \beta\cos\alpha}{\frac{\lambda}{\tan\alpha}(1 - \gamma_h(T)) - \gamma_h(T)\beta\sin\alpha}\right)\right] \cdot$$

$$\left[(1 - \beta\cos\alpha)^2 + \left(\frac{\lambda}{\tan\alpha}(1 - \gamma_h(T)) - \gamma_h(T)\beta\sin\alpha\right)^2\right]^{1/2}$$

$$C_2 = (\cos\alpha - \beta)$$

Figure 5:
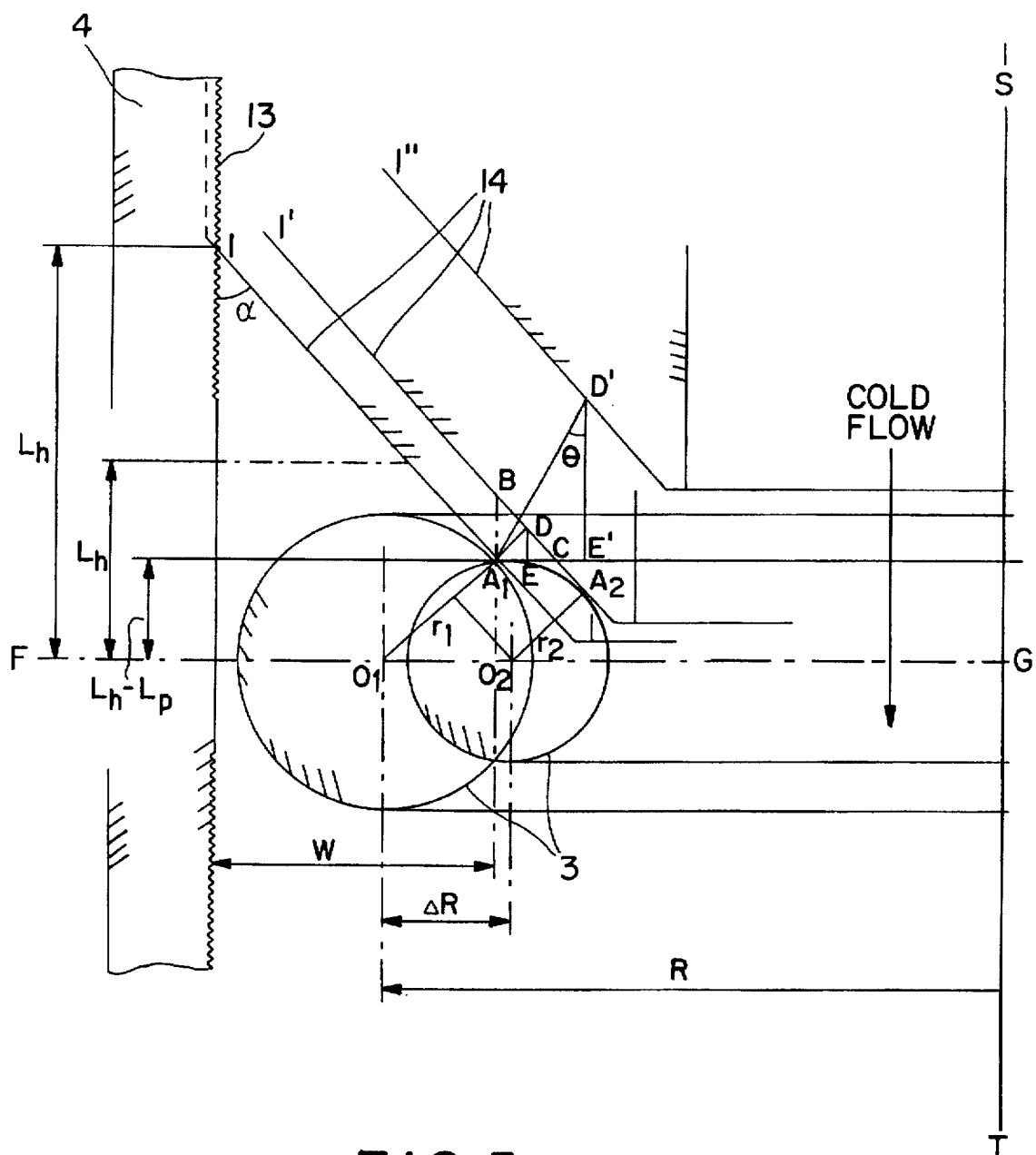
FIG. 5 depicts the geometric analysis of cryogenic shrinkage of the components of the contracting self-sealing cryogenic tube seal.
Figure 6A:
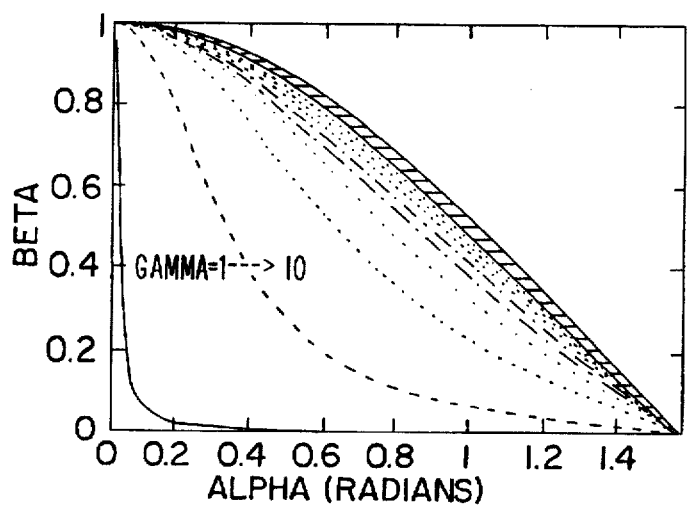
FIG. 6 is a graphic representation of the design criteria for the contracting self-sealing cryogenic tube seal.
Figure 6B:
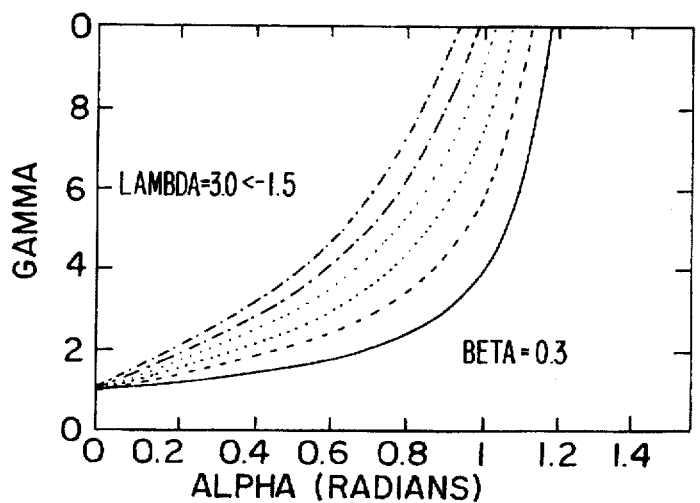
Figure 6C:
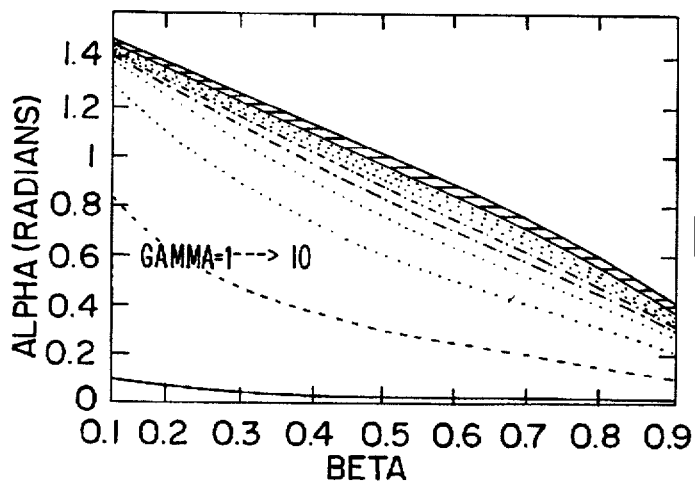
Figure 6D:
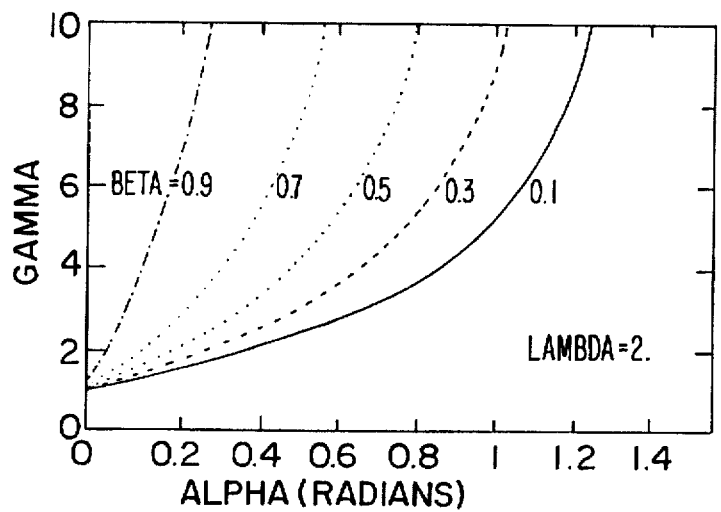
Figure 6E:
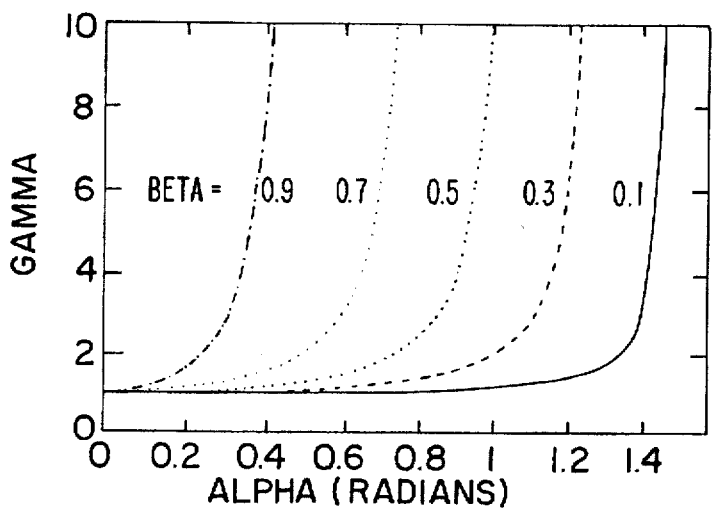
Figure 6F:
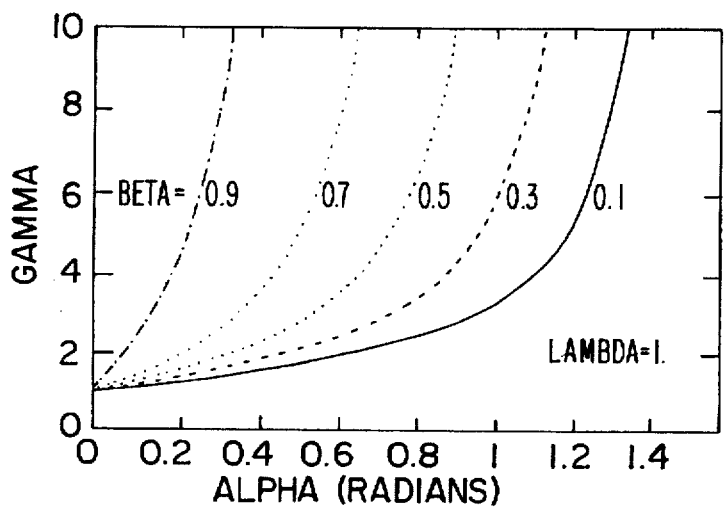

Referring to FIG. 5, $\alpha$ is the an-flared angle of the tube ends. $\beta$ is the radius ratio of O-ring spacer $r_1/R$. $\lambda$ is the ratio of the thickness of tube-end to the radius of the spacer, w/R. $\gamma_o(\gamma_o = \epsilon_o/\epsilon_p)$ is the ratio of thermal contraction of the material used for the spacer to that of the tube ends. $\gamma_h(\gamma_h = \epsilon_h/\epsilon_p)$ is the ratio of thermal contraction of the material used for the housing-nut to that of the tube ends. The parameters, $\alpha$, $\beta$, and $\lambda$, are the parameters of the seal geometry. $\gamma_o$ and $\gamma_h$ are the functions of temperature, which can be found from the tables of material properties and are well known in the art.

These criteria have been illustrated in the graphs of FIG. 6. The physics of the thermal contracting process or the thermal and geometric effects of the contracting/expanding self-sealing cryogenic seal is revealed by these criteria. The contracting/expanding self-sealing cryogenic seal is predictable in its response to temperature fluctuations—it consistently fulfills the promise of self-sealing for cryogenic applications.

A linear approximation of the sealing process in a thermal-contraction controlled-action seal by a simple geometric analysis was used to calculate design parameters of the contracting/expanding self-sealing cryogenic seal. The contracting self-sealing cryogenic tube seals exemplified herein were designed in accord with this analysis and have successfully passed a series of tests in the cryogenic leak test system with a temperature drop from room temperature down to the liquid helium temperature in the Cryogenic Laboratory of Florida Atlantic University.

Shown in FIG. 5 is the cross-section of an O-ring spacer seated between an-flared tube ends with axial angle, $\alpha$, before and after cooling period. Both O-ring spacer and tube end, which have different coefficients of thermal expansion, shrink axisymmetrically in the cooling process. $A_1$ and $A_2$ are two contact points of the mating parts before and after cooling. Because of the thermal contraction, the original contact point, $A_1$, in the tube end moves to D, with a radial shrinkage, $\Delta t = A_1E$, and an axial shrinkage, $\Delta L = ED$.

A maximum value of the shrinkage of the tube end in axial direction, $\Delta L$, can be obtained if presuming a zero-thermal-stress condition, which means free contracting of both O-ring spacer and tube end without losing contact with each other. It is apparent that if the actual axial shrinkage of the tube end is larger than the zero-thermal-stress shrinkage, $\Delta L$, the contracting self-sealing cryogenic seal will never achieve a leak-free seal.

From the geometry in FIG. 5, if we let $\Delta L' = A_1B$ and $\Delta t' = A_1C$, then $$\frac{\Delta L}{\Delta L'} = \frac{\Delta t' - \Delta t}{\Delta t'}$$

and $\Delta t' = \Delta L' \tan\alpha$, we have $$\Delta L = \Delta L' - \frac{\Delta t}{\tan\alpha} \quad (1)$$

and also, $$\Delta L' \sin\alpha + r_1 = \Delta R \cos\alpha + r_2$$

we have, $$\Delta L' = \frac{\Delta R}{\tan\alpha} - \frac{\Delta r}{\sin\alpha} \quad (2)$$

where $\Delta r = r_1 r_2$. Combining Eq. (1) and (2), $$\Delta L = \frac{1}{\tan\alpha}\left(\Delta R - \Delta t - \frac{\Delta r}{\cos\alpha}\right) \quad (3)$$

Assuming a linear contraction as a first approximation, i.e., $\Delta R = \epsilon_o R$, since r is much smaller than R, and $\Delta r = \epsilon_o r_1$ and $\Delta t = \epsilon_p(R - r_1 \cos\alpha)$ for the same approximation, where $\epsilon$ and $\epsilon_p$ are the coefficients of thermal expansion of O-ring spacer and tube end, respectively. Substituting $\Delta R$, $\Delta t$, and Δr into Eq. (3), we have, $$\Delta L = \frac{1}{\tan\alpha}\left[R(\epsilon_o - \epsilon_p) - r_1\left(\frac{\epsilon_o}{\cos\alpha} - \epsilon_p\cos\alpha\right)\right] \quad (4)$$

Let $\gamma = \epsilon_o/\epsilon_p$, and $\beta = 4_1/R$, we can rewrite Eq. (4) as $$\Delta L = \frac{R\epsilon_p}{\tan\alpha}\left[\gamma\left(1 - \frac{\beta}{\cos\alpha}\right) + \beta\cos\alpha - 1\right] \quad (5)$$

The maximum axial shrinkage of tube end, ΔL, from the above equation, is a function of three parameters, α, β, and γ, where α is the an-flared angle of the tube end, β is the radius ratio of the O-ring spacer, and γ is the ratio of thermal properties of material used for two mating parts.

In order to have a positive value of ΔL, the term in brackets must be positive, which leads to three design criteria for three parameters, each one depending on the other two, which are given as follows:

$$\gamma > \frac{1 - \beta\cos\alpha}{1 - \frac{\beta}{\cos\alpha}} \quad (A)$$

$$\beta < \frac{\gamma - 1}{\frac{\gamma}{\cos\alpha} - \cos\alpha} \quad (B)$$

$$\alpha < \cos^{-1}\left\{\left[\gamma + \left(\frac{\gamma-1}{2\beta}\right)^2\right]^{1/2} - \frac{\gamma-1}{2\beta}\right\} \quad (C)$$

According to the above criteria, α and β do not have lower limitations except for the negative values, which are meaningless for an O-ring seal. The lower limitations actually depend on the strength of the materials. The minimum value of α depends on the requirement for the wall thickness of the tube end. The minimum value of β depends on the requirement for the radius of the cross section of the O-ring spacer. The graphs of FIG. 6 represent possible values for α, β, and γ that can be used for the design of contracting self-sealing cryogenic seal. In Table 1, a dimensionless parameter of ΔL/R$\epsilon_p$, is given which is computed from Eq. (5) for the convenience of applications. For example, if we choose α=35°, and β=0.3, then γ must be larger than 1.2. If we chose γ=6 (for copper O-ring and invar tube end), we have ΔL/R$\epsilon_p$=4.5. If R=8 mm, and $\epsilon_p$=0.06% (invar at 6K), the maximum promising axial shrinkage, ΔL=0.022 mm. This is an approximate value for the tested contracting self-sealing cryogenic seal at liquid helium temperature.

EXAMPLE 4

Selection of Materials for Contracting/Expanding Self-Sealing Cryogenic Seals

The function of a contracting/expanding self-sealing cryogenic seal relies upon the differences of the thermal contractions of dissimilar materials in a specially composed structure which, in a novel, advantageous manner uses the concept of sloped-surface sealing. The selection of materials is basically determined by the nature of thermal contraction of the materials used for each of the components. The contracting/expanding self-sealing cryogenic seal works only if it is designed to meet the criteria which are dependent upon not only the thermal properties of materials, but also the geometric parameters. The selection of the materials, therefore, is not an independent factor in order to achieve a self-sealing purpose. It must be considered together with the geometric parameters of the components of the seal. In this regard, the contracting self-sealing cryogenic seal is an integrated unit.

One of the possible combinations is given as follows: The material for tube ends is commonly the same as that for the tubing bodies. For cryogenic situations, stainless steel is a commonly-used material for tubing bodies. Therefore, among other common engineering materials, in the embodiment depicted in FIG. 1, copper is one of the possible choices for the housing nut and the O-ring spacer, used with the stainless steel tube ends. However, the geometric configuration must meet the contracting self-sealing cryogenic criteria disclosed above with the given parameter of thermal contraction ratio calculated for copper to stainless steel.

EXAMPLE 5

Test Results of Various Embodiments of Contracting Self-Sealing Cryogenic Seal

The contracting self-sealing cryogenic seals have passed a series of tests in the cryogenic leak test system at Florida Atlantic University. The detailed information of the cryogenic leak test system is given in Jia, L. X., D. Moslemian, W. L. Chow (1992) "Cryogenic leak testing of tube fittings/valves," *Cryogenics* 32(9):833–839, which is incorporated herein by reference thereto. The tests were conducted under two different temperature levels, $LN_2$ temperature (≈77K), and LHe temperature (≈4K).

For the leak test under $LN_2$ temperature, the highest internal pressure against the external vacuum applied to this seal has been 31×10$^5$ Pa, nearly two times the working pressure in the space shuttle. The test lasted about ten hours without showing any signs of leak from vacuum gauges at pressure of 5×10$^{-4}$ Bar within the sample chamber. In another test, initial pressurization was to 27.1×10$^5$ Pa. As the temperature dropped to 140K, additional gaseous helium was supplied to increase the internal pressure from 12×10$^5$ Pa to 26.2×10$^5$ Pa. When the equilibrium temperature of 77K was reached, internal pressure was reduced down to 17.2×10$^5$ Pa and kept under this condition for another 10 hours. Throughout the testing period, no pressure increase was detected in the evacuated sample chamber used to house the seal.

For the leak test under LHe temperature, a constant internal pressure of 27.1×10$^5$ Pa against the external vacuum was applied to the contracting self-sealing cryogenic tube seal. The test lasted 5 hours at the temperature of 4.5K–6.9K without showing any signs of leak from vacuum gauges at pressure of 1×10$^{-6}$ Bar within the sample chamber. The tests on the contracting self-sealing cryogenic tube seals at LHe temperature indicated that it is feasible to develop a new series of cryogenic tube seals for the $LH_2$ transfer lines of the space shuttle, as well as for other cryogenic applications, based on the novel sloped-sealing technology taught herein.

EXAMPLE 6

Contracting/Expanding Self-Sealing Cryogenic Seal

Figure 7:
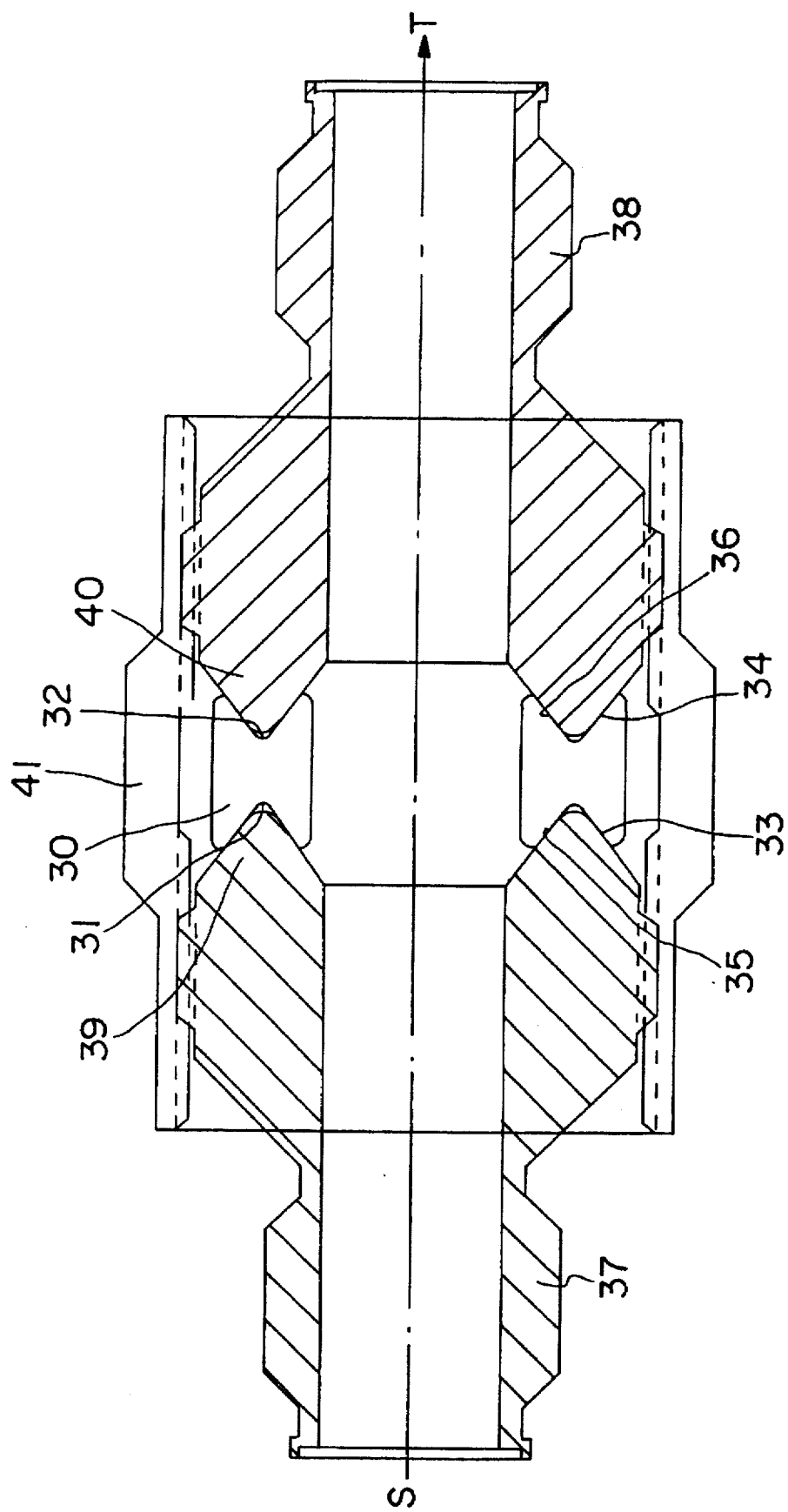
FIG. 7 depicts a longitudinal section through a preferred embodiment of a contracting/expanding self-sealing cryogenic tube seal.

The concept for a contracting self-sealing cryogenic tube seal can be extended for a special application where a wide range and high rate of temperature cycling is a significant feature of the working condition. A contracting/expanding self-sealing cryogenic tube fitting is schematically shown in FIG. 7. With larger thermal contraction and thermal expansion coefficients, the shrinking or expanding displacement of the spacer caused by temperature cycling always tends to prevent the appearance of any possible leak gap between the tube ends and the spacer, no matter whether the working temperature is decreasing or increasing. A similar analysis for a contracting/expanding self-sealing cryogenic seal can be easily obtained as described above by considering an additional reverse thermal process of temperature increase.

In a contracting/expanding self-sealing cryogenic seal as depicted in FIG. 7, the spacer 30 has an H-shaped cross-section, having opposed V-shaped female sloped-sealing surfaces 31 and 32 at each end which contact the complementary sloped male an-flare tube ends 39 and 40, respectively, of the coupling members 37 and 38. The male angle of the tube end is made slightly larger than the female angle of the corresponding surface of the spacer 30. A similar H-shaped spacer/seal is depicted in FIG. 9, wherein the sloped surface sealing is accomplished by contact of curved surfaces. When temperature is decreased, the outwardmost contact surfaces 33 and 34 of the spacer 30 will tightly grip the tube ends 39 and 40. When temperature is increased, the inside contact surfaces 35 and 36 of the spacer 30 will tightly press against the tube ends 39 and 40. Therefore, a tight seal is achieved under the temperature cycling condition. Since the temperature changes in two opposite directions, the thermal behavior of the housing nut 41 no longer contributes consistently for tube sealing during the temperature cycling. Therefore, in a preferred embodiment, the material for the housing nut 41 has a smaller coefficient of thermal contraction (or expansion) than does the spacer 30. The material for coupling members 37 and 38 also has a smaller coefficient of thermal expansion than does that of spacer 30. The selection of materials for the spacer 30 and tube ends 39 and 40 of contracting/expanding self-sealing cryogenic seals follows the same design criteria given above. In a preferred embodiment, the subject seal, seemingly sophisticated, surprisingly simply solves sometimes severe system seepage substantially superior to standard space shuttle seals by specially-selected, securely sandwiched, sloped-surface spacers snugly surrounding stainless steel surfaces shown self-sealing by sequential shrinking and swelling.

Figure 8B:
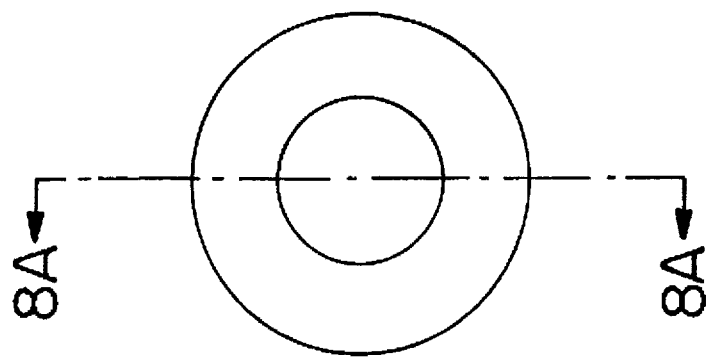
FIG. 8 is a schematic drawing of an H-shaped spacer of a preferred embodiment of the contracting/expanding self-sealing cryogenic tube seal.
Figure 8A:
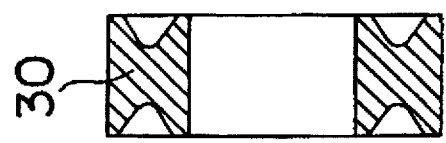
Figure 11A:
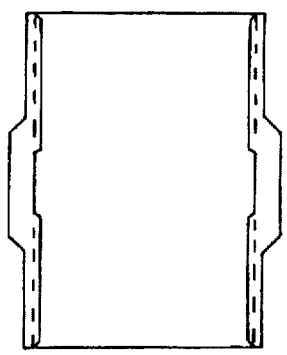
FIG. 11 is a schematic drawing of a preferred embodiment of the housing nut of the contracting/expanding self sealing cryogenic tube seal.
Figure 11B:
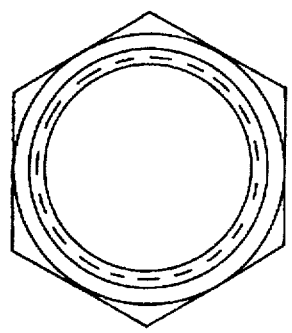
Figure 10B:
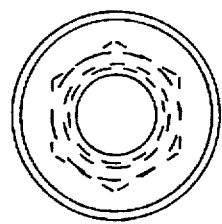
FIG. 10 is a schematic drawing of a preferred embodiment of a coupling member of the contracting/expanding self sealing cryogenic tube seal.
Figure 10D:
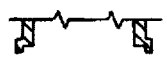
Figure 10A:
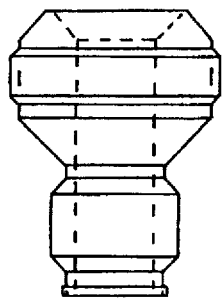
Figure 10C:
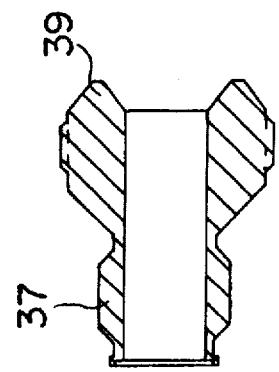
Figure 12B:
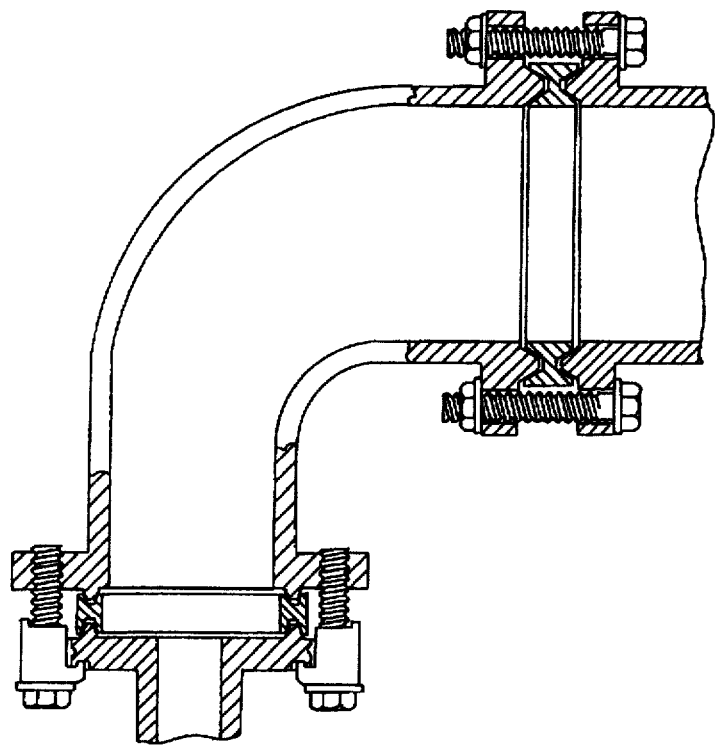
FIG. 12 depicts various embodiments of the contracting/expanding self sealing cryogenic tube seal in potential operational configurations.
Figure 12A:
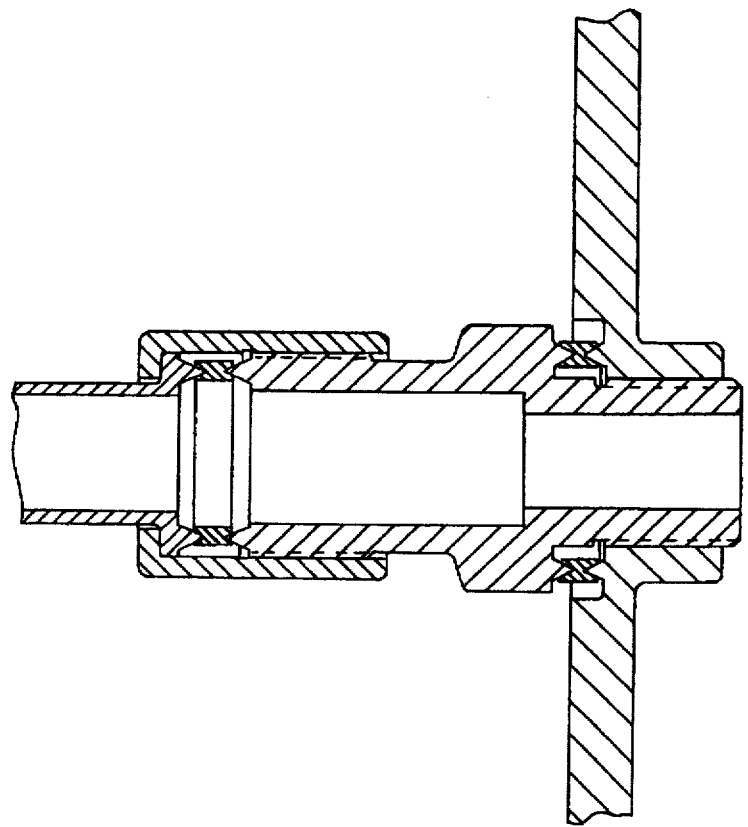

One preferred embodiment of the contracting/expanding self-sealing cryogenic seal was fabricated for use in the $LH_2$ lines of the space shuttle at the JFK Space Center. The H-shaped spacer 30 (see FIGS. 7 and 8) has a larger thermal expansion coefficient than that of the tube ends 39 and 40 between which it is sandwiched. Shrinkage or expansion of this spacer always tends to prevent the formation of any possible leaking gap between the tube ends and the spacer, regardless of whether the working temperature is decreasing or increasing. The contracting/expanding self-sealing cryogenic tube seal provides leak-free and easily remountable tube connections from temperatures as high as the component materials can withstand to cryogenic temperatures as low as that of liquid helium, and under pressures varying from vacuum to several hundred psi or more. The seal is especially effective in applications where a wide range and high rate temperature cycling are significant features of the working conditions. The seal can be easily integrated into all kinds of cryogenic tubing components, such as fittings and valves. Several possible configurations which employ the contracting/expanding self-sealing cryogenic tube seal are shown in FIG. 12. The contracting/expanding self-sealing cryogenic seal has passed the temperature cycling test: first cooled down from 296K to 12K, then heated up to 300K within 20 minutes, and then cooled down again to 77K, while the pressure maintained 400 psig, without showing any sign of leak.

It should be understood that the examples and embodiments described herein are for illustrative purposes only and that various modifications or changes in light thereof will be suggested to persons skilled in the art and are to be included within the spirit and purview of this application and the scope of the appended claims.

TABLE 1

Design Parameters for CSSC Tube Fitting, $(d1 = \Delta L/Re_p)$.

| gama(beta = 0.1000000 | | alfa = 5) > | 1.000848 |
|---|---|---|---|
| | gama | beta | alfa | |
| dl( | 1.000848 | 0.1000000 | 5 )= | 0.0000000E + 00 |
| dl( | 1.500848 | 0.1000000 | 5 )= | 5.141342 |
| dl( | 2.000848 | 0.1000000 | 5 )= | 10.28268 |
| dl( | 2.500848 | 0.1000000 | 5 )= | 15.42402 |
| dl( | 3.000848 | 0.1000000 | 5 )= | 20.56536 |
| dl( | 3.500848 | 0.1000000 | 5 )= | 25.70670 |
| dl( | 4.000848 | 0.1000000 | 5 )= | 30.84805 |
| dl( | 4.500848 | 0.1000000 | 5 )= | 35.98938 |
| dl( | 5.000848 | 0.1000000 | 5 )= | 41.13073 |
| dl( | 5.500848 | 0.1000000 | 5 )= | 46.27207 |
| dl( | 6.000848 | 0.1000000 | 5 )= | 51.41341 |
| gama(beta = 0.1000000 | | alfa = 10) > | 1.003408 |
| | gama | beta | alfa | |
| dl( | 1.003408 | 0.1000000 | 10 )= | 0.0000000E + 00 |
| dl( | 1.503408 | 0.1000000 | 10 )= | 2.547703 |
| dl( | 2.003408 | 0.1000000 | 10 )= | 5.095405 |
| dl( | 2.503408 | 0.1000000 | 10 )= | 7.643107 |
| dl( | 3.003408 | 0.1000000 | 10 )= | 10.19081 |
| dl( | 3.503408 | 0.1000000 | 10 )= | 12.73851 |
| dl( | 4.003408 | 0.1000000 | 10 )= | 15.28621 |
| dl( | 4.503408 | 0.1000000 | 10 )= | 17.83392 |
| dl( | 5.003408 | 0.1000000 | 10 )= | 20.38162 |
| dl( | 5.503408 | 0.1000000 | 10 )= | 22.92932 |
| dl( | 6.003408 | 0.1000000 | 10 )= | 25.47702 |
| gama(beta = 0.1000000 | | alfa = 15) > | 1.007736 |
| | gama | beta | alfa | |
| dl( | 1.007736 | 0.1000000 | 15 )= | 0.0000000E + 00 |
| dl( | 1.507736 | 0.1000000 | 15 )= | 1.672840 |
| dl( | 2.007736 | 0.1000000 | 15 )= | 3.345681 |
| dl( | 2.507736 | 0.1000000 | 15 )= | 5.018521 |
| dl( | 3.007736 | 0.1000000 | 15 )= | 6.691361 |
| dl( | 3.507736 | 0.1000000 | 15 )= | 8.364202 |
| dl( | 4.007736 | 0.1000000 | 15 )= | 10.03704 |
| dl( | 4.507736 | 0.1000000 | 15 )= | 11.70988 |
| dl( | 5.007736 | 0.1000000 | 15 )= | 13.38272 |
| dl( | 5.507736 | 0.1000000 | 15 )= | 15.05556 |
| dl( | 6.007736 | 0.1000000 | 15 )= | 16.72840 |
| gama(beta = 0.1000000 | | alfa = 20) > | 1.013931 |
| | gama | beta | alfa | |
| dl( | 1.013931 | 0.1000000 | 20 )= | 0.0000000E + 00 |
| dl( | 1.513931 | 0.1000000 | 20 )= | 1.227548 |
| dl( | 2.013931 | 0.1000000 | 20 )= | 2.455097 |
| dl( | 2.513931 | 0.1000000 | 20 )= | 3.682646 |
| dl( | 3.013931 | 0.1000000 | 20 )= | 4.910194 |
| dl( | 3.513931 | 0.1000000 | 20 )= | 6.137743 |
| dl( | 4.013931 | 0.1000000 | 20 )= | 7.365292 |
| dl( | 4.513931 | 0.1000000 | 20 )= | 8.592841 |
| dl( | 5.013931 | 0.1000000 | 20 )= | 9.820390 |
| dl( | 5.513931 | 0.1000000 | 20 )= | 11.04794 |
| dl( | 6.013931 | 0.1000000 | 20 )= | 12.27549 |
| gama(beta = 0.1000000 | | alfa = 25) > | 1.022151 |
| | gama | beta | alfa | |
| dl( | 1.022151 | 0.1000000 | 25 )= | 0.0000000E + 00 |
| dl( | 1.522151 | 0.1000000 | 25 )= | 0.9539434 |
| dl( | 2.022151 | 0.1000000 | 25 )= | 1.907887 |
| dl( | 2.522151 | 0.1000000 | 25 )= | 2.861830 |
| dl( | 3.022151 | 0.1000000 | 25 )= | 3.815774 |
| dl( | 3.522151 | 0.1000000 | 25 )= | 4.769717 |
| dl( | 4.022151 | 0.1000000 | 25 )= | 5.723660 |
| dl( | 4.522151 | 0.1000000 | 25 )= | 6.677603 |
| dl( | 5.022151 | 0.1000000 | 25 )= | 7.631547 |
| dl( | 5.522151 | 0.1000000 | 25 )= | 8.585490 |
| dl( | 6.022151 | 0.1000000 | 25 )= | 9.539434 |
| gama(beta = 0.1000000 | | alfa = 30) > | 1.032636 |
| | gama | beta | alfa | |
| dl( | 1.032636 | 0.1000000 | 30 )= | 0.0000000E + 00 |
| dl( | 1.532636 | 0.1000000 | 30 )= | 0.7660255 |
| dl( | 2.032636 | 0.1000000 | 30 )= | 1.532051 |
| dl( | 2.532636 | 0.1000000 | 30 )= | 2.298077 |
| dl( | 3.032636 | 0.1000000 | 30 )= | 3.064102 |
| dl( | 3.532636 | 0.1000000 | 30 )= | 3.830127 |

TABLE 1-continued

Design Parameters for CSSC Tube Fitting, $(d1 = \Delta L/Re_p)$.

| | | | | | |
|---|---|---|---|---|---|
| dl( | 4.032636 | 0.1000000 | 30 | )= | 4.596153 |
| dl( | 4.532636 | 0.1000000 | 30 | )= | 5.362179 |
| dl( | 5.032636 | 0.1000000 | 30 | )= | 6.128204 |
| dl( | 5.532636 | 0.1000000 | 30 | )= | 6.894230 |
| dl( | 6.032636 | 0.1000000 | 30 | )= | 7.660254 |
| gama(beta = 0.1000000 | | alfa = 35) > | | 1.045747 | |
| | gama | beta | alfa | | |
| dl( | 1.045747 | 0.1000000 | 35 | )= | 0.0000000E + 00 |
| dl( | 1.545747 | 0.1000000 | 35 | )= | 0.6269017 |
| dl( | 2.045747 | 0.1000000 | 35 | )= | 1.253803 |
| dl( | 2.545747 | 0.1000000 | 35 | )= | 1.880705 |
| dl( | 3.045747 | 0.1000000 | 35 | )= | 2.507607 |
| dl( | 3.545747 | 0.1000000 | 35 | )= | 3.134508 |
| dl( | 4.045747 | 0.1000000 | 35 | )= | 3.761410 |
| dl( | 4.545747 | 0.1000000 | 35 | )= | 4.388311 |
| dl( | 5.045747 | 0.1000000 | 35 | )= | 5.015213 |
| dl( | 5.545747 | 0.1000000 | 35 | )= | 5.642115 |
| dl( | 6.045747 | 0.1000000 | 35 | )= | 6.269017 |
| gama(beta = 0.1000000 | | alfa = 40) > | | 1.062034 | |
| | gama | beta | alfa | | |
| dl( | 1.062034 | 0.1000000 | 40 | )= | −7.1034052E − 08 |
| dl( | 1.562034 | 0.1000000 | 40 | )= | 0.5180907 |
| dl( | 2.062034 | 0.1000000 | 40 | )= | 1.036181 |
| dl( | 2.562034 | 0.1000000 | 40 | )= | 1.554272 |
| dl( | 3.062034 | 0.1000000 | 40 | )= | 2.072362 |
| dl( | 3.562034 | 0.1000000 | 40 | )= | 2.590453 |
| dl( | 4.062034 | 0.1000000 | 40 | )= | 3.108544 |
| dl( | 4.562034 | 0.1000000 | 40 | )= | 3.626635 |
| dl( | 5.062034 | 0.1000000 | 40 | )= | 4.144725 |
| dl( | 5.562034 | 0.1000000 | 40 | )= | 4.662816 |
| dl( | 6.062034 | 0.1000000 | 40 | )= | 5.180906 |
| gama(beta = 0.1000000 | | alfa = 45) > | | 1.082358 | |
| | gama | beta | alfa | | |
| dl( | 1.082358 | 0.1000000 | 45 | )= | 0.0000000E + 00 |
| dl( | 1.582358 | 0.1000000 | 45 | )= | 0.4292893 |
| dl( | 2.082358 | 0.1000000 | 45 | )= | 0.8585786 |
| dl( | 2.582358 | 0.1000000 | 45 | )= | 1.287868 |
| dl( | 3.082358 | 0.1000000 | 45 | )= | 1.717157 |
| dl( | 3.582358 | 0.1000000 | 45 | )= | 2.146446 |
| dl( | 4.082358 | 0.1000000 | 45 | )= | 2.575736 |
| dl( | 4.582358 | 0.1000000 | 45 | )= | 3.005025 |
| dl( | 5.082358 | 0.1000000 | 45 | )= | 3.434314 |
| dl( | 5.582358 | 0.1000000 | 45 | )= | 3.863604 |
| dl( | 6.082358 | 0.1000000 | 45 | )= | 4.292893 |
| gama(beta = 0.1000000 | | alfa = 50) > | | 1.108113 | |
| | gama | beta | alfa | | |
| dl( | 1.108113 | 0.1000000 | 50 | )= | 0.0000000E + 00 |
| dl( | 1.608113 | 0.1000000 | 50 | )= | 0.3542794 |
| dl( | 2.108113 | 0.1000000 | 50 | )= | 0.7085589 |
| dl( | 2.608113 | 0.1000000 | 50 | )= | 1.062838 |
| dl( | 3.108113 | 0.1000000 | 50 | )= | 1.417118 |
| dl( | 3.608113 | 0.1000000 | 50 | )= | 1.771397 |
| dl( | 4.108113 | 0.1000000 | 50 | )= | 2.125677 |
| dl( | 4.608113 | 0.1000000 | 50 | )= | 2.479956 |
| dl( | 5.108113 | 0.1000000 | 50 | )= | 2.834235 |
| dl( | 5.608113 | 0.1000000 | 50 | )= | 3.188515 |
| dl( | 6.108113 | 0.1000000 | 50 | )= | 3.542794 |
| gama(beta = 0.1000000 | | alfa = 55) > | | 1.141690 | |
| | gama | beta | alfa | | |
| dl( | 1.141690 | 0.1000000 | 55 | )= | 0.0000000E + 00 |
| dl( | 1.641690 | 0.1000000 | 55 | )= | 0.2890651 |
| dl( | 2.141690 | 0.1000000 | 55 | )= | 0.5781302 |
| dl( | 2.641690 | 0.1000000 | 55 | )= | 0.8671951 |
| dl( | 3.141690 | 0.1000000 | 55 | )= | 1.156260 |
| dl( | 3.641690 | 0.1000000 | 55 | )= | 1.445325 |
| dl( | 4.141690 | 0.1000000 | 55 | )= | 1.734390 |
| dl( | 4.641690 | 0.1000000 | 55 | )= | 2.023455 |
| dl( | 5.141690 | 0.1000000 | 55 | )= | 2.312521 |
| dl( | 5.641690 | 0.1000000 | 55 | )= | 2.601585 |
| dl( | 6.141690 | 0.1000000 | 55 | )= | 2.890651 |
| gama(beta = 0.1000000 | | alfa = 60) > | | 1.187500 | |
| | gama | beta | alfa | | |
| dl( | 1.187500 | 0.1000000 | 60 | )= | 0.0000000E + 00 |
| dl( | 1.687500 | 0.1000000 | 60 | )= | 0.2309401 |
| dl( | 2.187500 | 0.1000000 | 60 | )= | 0.4618802 |
| dl( | 2.687500 | 0.1000000 | 60 | )= | 0.6928203 |
| dl( | 3.187500 | 0.1000000 | 60 | )= | 0.9237604 |
| dl( | 3.687500 | 0.1000000 | 60 | )= | 1.154701 |
| dl( | 4.187500 | 0.1000000 | 60 | )= | 1.385641 |
| dl( | 4.687500 | 0.1000000 | 60 | )= | 1.616581 |
| dl( | 5.187500 | 0.1000000 | 60 | )= | 1.847521 |
| dl( | 5.687500 | 0.1000000 | 60 | )= | 2.078461 |
| dl( | 6.187500 | 0.1000000 | 60 | )= | 2.309401 |
| gama(beta = 0.1000000 | | alfa = 65) > | | 1.254602 | |
| | gama | beta | alfa | | |
| dl( | 1.254602 | 0.1000000 | 65 | )= | 0.0000000E + 00 |
| dl( | 1.754602 | 0.1000000 | 65 | )= | 0.1779849 |
| dl( | 2.254602 | 0.1000000 | 65 | )= | 0.3559698 |
| dl( | 2.754602 | 0.1000000 | 65 | )= | 0.5339549 |
| dl( | 3.254602 | 0.1000000 | 65 | )= | 0.7119397 |
| dl( | 3.754602 | 0.1000000 | 65 | )= | 0.8899247 |
| dl( | 4.254602 | 0.1000000 | 65 | )= | 1.067910 |
| dl( | 4.754602 | 0.1000000 | 65 | )= | 1.245895 |
| dl( | 5.254602 | 0.1000000 | 65 | )= | 1.423879 |
| dl( | 5.754602 | 0.1000000 | 65 | )= | 1.601864 |
| dl( | 6.254602 | 0.1000000 | 65 | )= | 1.779849 |
| gama(beta = 0.1000000 | | alfa = 70) > | | 1.364855 | |
| | gama | beta | alfa | | |
| dl( | 1.364855 | 0.1000000 | 70 | )= | 0.0000000E + 00 |
| dl( | 1.864855 | 0.1000000 | 70 | )= | 0.1287762 |
| dl( | 2.364855 | 0.1000000 | 70 | )= | 0.2575525 |
| dl( | 2.864855 | 0.1000000 | 70 | )= | 0.3863288 |
| dl( | 3.364855 | 0.1000000 | 70 | )= | 0.5151050 |
| dl( | 3.864855 | 0.1000000 | 70 | )= | 0.6438813 |
| dl( | 4.364855 | 0.1000000 | 70 | )= | 0.7726575 |
| dl( | 4.864855 | 0.1000000 | 70 | )= | 0.9014338 |
| dl( | 5.364855 | 0.1000000 | 70 | )= | 1.030210 |
| dl( | 5.864855 | 0.1000000 | 70 | )= | 1.158986 |
| dl( | 6.364855 | 0.1000000 | 70 | )= | 1.287763 |
| gama(beta = 0.1000000 | | alfa = 75) > | | 1.587469 | |
| | gama | beta | alfa | | |
| dl( | 1.587469 | 0.1000000 | 75 | )= | 0.0000000E + 00 |
| dl( | 2.087469 | 0.1000000 | 75 | )= | 8.2210816E − 02 |
| dl( | 2.587469 | 0.1000000 | 75 | )= | 0.1644216 |
| dl( | 3.087469 | 0.1000000 | 75 | )= | 0.2466324 |
| dl( | 3.587469 | 0.1000000 | 75 | )= | 0.3288433 |
| dl( | 4.087469 | 0.1000000 | 75 | )= | 0.4110541 |
| dl( | 4.587469 | 0.1000000 | 75 | )= | 0.4932648 |
| dl( | 5.087469 | 0.1000000 | 75 | )= | 0.5754756 |
| dl( | 5.587469 | 0.1000000 | 75 | )= | 0.6576865 |
| dl( | 6.087469 | 0.1000000 | 75 | )= | 0.7398973 |
| dl( | 6.587469 | 0.1000000 | 75 | )= | 0.8221080 |
| gama(beta = 0.1000000 | | alfa = 80) > | | 2.316863 | |
| | gama | beta | alfa | | |
| dl( | 2.316863 | 0.1000000 | 80 | )= | −1.0509909E − 08 |
| dl( | 2.816863 | 0.1000000 | 80 | )= | 3.7392177E − 02 |
| dl( | 3.316863 | 0.1000000 | 80 | )= | 7.4784376E − 02 |
| dl( | 3.816863 | 0.1000000 | 80 | )= | 0.1121766 |
| dl( | 4.316863 | 0.1000000 | 80 | )= | 0.1495687 |
| dl( | 4.816863 | 0.1000000 | 80 | )= | 0.1869609 |
| dl( | 5.316863 | 0.1000000 | 80 | )= | 0.2243531 |
| dl( | 5.816863 | 0.1000000 | 80 | )= | 0.2617453 |
| dl( | 6.316863 | 0.1000000 | 80 | )= | 0.2991375 |
| dl( | 6.816863 | 0.1000000 | 80 | )= | 0.3365296 |
| dl( | 7.316863 | 0.1000000 | 80 | )= | 0.3739218 |
| gama(beta = 0.2000000 | | alfa = 5) > | | 1.001908 | |
| | gama | beta | alfa | | |
| dl( | 1.001908 | 0.2000000 | 5 | )= | 0.0000000E + 00 |
| dl( | 1.501908 | 0.2000000 | 5 | )= | 4.567655 |
| dl( | 2.001908 | 0.2000000 | 5 | )= | 9.135310 |
| dl( | 2.501908 | 0.2000000 | 5 | )= | 13.70297 |
| dl( | 3.001908 | 0.2000000 | 5 | )= | 18.27062 |
| dl( | 3.501908 | 0.2000000 | 5 | )= | 22.83828 |
| dl( | 4.001908 | 0.2000000 | 5 | )= | 27.40593 |
| dl( | 4.501908 | 0.2000000 | 5 | )= | 31.97359 |
| dl( | 5.001908 | 0.2000000 | 5 | )= | 36.54124 |
| dl( | 5.501908 | 0.2000000 | 5 | )= | 41.10890 |
| dl( | 6.001908 | 0.2000000 | 5 | )= | 45.67656 |
| gama(beta = 0.2000000 | | alfa = 10) > | | 1.007684 | |
| | gama | beta | alfa | | |
| dl( | 1.007684 | 0.2000000 | 10 | )= | 0.0000000E + 00 |
| dl( | 1.507684 | 0.2000000 | 10 | )= | 2.259764 |
| dl( | 2.007684 | 0.2000000 | 10 | )= | 4.519529 |
| dl( | 2.507684 | 0.2000000 | 10 | )= | 6.779292 |

TABLE 1-continued

Design Parameters for CSSC Tube Fitting, (dl = ΔL/R$\epsilon_p$).

| | | | | | |
|---|---|---|---|---|---|
| dl( | 3.007684 | 0.2000000 | 10 | )= | 9.039058 |
| dl( | 3.507684 | 0.2000000 | 10 | )= | 11.29882 |
| dl( | 4.007684 | 0.2000000 | 10 | )= | 13.55858 |
| dl( | 4.507684 | 0.2000000 | 10 | )= | 15.81835 |
| dl( | 5.007684 | 0.2000000 | 10 | )= | 18.07811 |
| dl( | 5.507684 | 0.2000000 | 10 | )= | 20.33787 |
| dl( | 6.007684 | 0.2000000 | 10 | )= | 22.59764 |
| gama(beta = 0.2000000 | | alfa = 15) > | | 1.017492 | |
| | gama | beta | alfa | | |
| dl( | 1.017492 | 0.2000000 | 15 | )= | 0.0000000E + 00 |
| dl( | 1.517492 | 0.2000000 | 15 | )= | 1.479655 |
| dl( | 2.017492 | 0.2000000 | 15 | )= | 2.959310 |
| dl( | 2.517492 | 0.2000000 | 15 | )= | 4.438965 |
| dl( | 3.017492 | 0.2000000 | 15 | )= | 5.918621 |
| dl( | 3.517492 | 0.2000000 | 15 | )= | 7.398275 |
| dl( | 4.017492 | 0.2000000 | 15 | )= | 8.877931 |
| dl( | 4.517492 | 0.2000000 | 15 | )= | 10.35759 |
| dl( | 5.017492 | 0.2000000 | 15 | )= | 11.83724 |
| dl( | 5.517492 | 0.2000000 | 15 | )= | 13.31690 |
| dl( | 6.017492 | 0.2000000 | 15 | )= | 14.79655 |
| gama(beta = 0.2000000 | | alfa = 20) > | | 1.031629 | |
| | gama | beta | alfa | | |
| dl( | 1.031629 | 0.2000000 | 20 | )= | 0.0000000E + 00 |
| dl( | 1.531629 | 0.2000000 | 20 | )= | 1.081358 |
| dl( | 2.031629 | 0.2000000 | 20 | )= | 2.162717 |
| dl( | 2.531629 | 0.2000000 | 20 | )= | 3.244075 |
| dl( | 3.031629 | 0.2000000 | 20 | )= | 4.325433 |
| dl( | 3.531629 | 0.2000000 | 20 | )= | 5.406792 |
| dl( | 4.031629 | 0.2000000 | 20 | )= | 6.488149 |
| dl( | 4.531629 | 0.2000000 | 20 | )= | 7.569508 |
| dl( | 5.031629 | 0.2000000 | 20 | )= | 8.650867 |
| dl( | 5.531629 | 0.2000000 | 20 | )= | 9.732225 |
| dl( | 6.031629 | 0.2000000 | 20 | )= | 10.81358 |
| gama(beta = 0.2000000 | | alfa = 25) > | | 1.050575 | |
| | gama | beta | alfa | | |
| dl( | 1.050575 | 0.2000000 | 25 | )= | 0.0000000E + 00 |
| dl( | 1.550575 | 0.2000000 | 25 | )= | 0.8356334 |
| dl( | 2.050575 | 0.2000000 | 25 | )= | 1.671267 |
| dl( | 2.550575 | 0.2000000 | 25 | )= | 2.506900 |
| dl( | 3.050575 | 0.2000000 | 25 | )= | 3.342533 |
| dl( | 3.550575 | 0.2000000 | 25 | )= | 4.178166 |
| dl( | 4.050575 | 0.2000000 | 25 | )= | 5.013800 |
| dl( | 4.550575 | 0.2000000 | 25 | )= | 5.849433 |
| dl( | 5.050575 | 0.2000000 | 25 | )= | 6.685066 |
| dl( | 5.550575 | 0.2000000 | 25 | )= | 7.520700 |
| dl( | 6.050575 | 0.2000000 | 25 | )= | 8.356333 |
| gama(beta = 0.2000000 | | alfa = 30) > | | 1.075072 | |
| | gama | beta | alfa | | |
| dl( | 1.075072 | 0.2000000 | 30 | )= | −1.0323828E − 07 |
| dl( | 1.575072 | 0.2000000 | 30 | )= | 0.6660254 |
| dl( | 2.075072 | 0.2000000 | 30 | )= | 1.332051 |
| dl( | 2.575072 | 0.2000000 | 30 | )= | 1.998076 |
| dl( | 3.075072 | 0.2000000 | 30 | )= | 2.664102 |
| dl( | 3.575072 | 0.2000000 | 30 | )= | 3.330127 |
| dl( | 4.075072 | 0.2000000 | 30 | )= | 3.996153 |
| dl( | 4.575072 | 0.2000000 | 30 | )= | 4.662178 |
| dl( | 5.075072 | 0.2000000 | 30 | )= | 5.328203 |
| dl( | 5.575072 | 0.2000000 | 30 | )= | 5.994229 |
| dl( | 6.075072 | 0.2000000 | 30 | )= | 6.660254 |
| gama(beta = 0.2000000 | | alfa = 35) > | | 1.106271 | |
| | gama | beta | alfa | | |
| dl( | 1.106271 | 0.2000000 | 35 | )= | 0.0000000E + 00 |
| dl( | 1.606271 | 0.2000000 | 35 | )= | 0.5397293 |
| dl( | 2.106271 | 0.2000000 | 35 | )= | 1.079459 |
| dl( | 2.606271 | 0.2000000 | 35 | )= | 1.619188 |
| dl( | 3.106271 | 0.2000000 | 35 | )= | 2.158918 |
| dl( | 3.606271 | 0.2000000 | 35 | )= | 2.698647 |
| dl( | 4.106271 | 0.2000000 | 35 | )= | 3.238376 |
| dl( | 4.606271 | 0.2000000 | 35 | )= | 3.778105 |
| dl( | 5.106271 | 0.2000000 | 35 | )= | 4.317834 |
| dl( | 5.606271 | 0.2000000 | 35 | )= | 4.857564 |
| dl( | 6.106271 | 0.2000000 | 35 | )= | 5.397293 |
| gama(beta = 0.2000000 | | alfa = 40) > | | 1.145987 | |
| | gama | beta | alfa | | |
| dl( | 1.145987 | 0.2000000 | 40 | )= | 0.0000000E + 00 |
| dl( | 1.645987 | 0.2000000 | 40 | )= | 0.4403043 |
| dl( | 2.145987 | 0.2000000 | 40 | )= | 0.8806087 |
| dl( | 2.645987 | 0.2000000 | 40 | )= | 1.320913 |
| dl( | 3.145987 | 0.2000000 | 40 | )= | 1.761218 |
| dl( | 3.645987 | 0.2000000 | 40 | )= | 2.201522 |
| dl( | 4.145987 | 0.2000000 | 40 | )= | 2.641827 |
| dl( | 4.645987 | 0.2000000 | 40 | )= | 3.082131 |
| dl( | 5.145987 | 0.2000000 | 40 | )= | 3.522435 |
| dl( | 5.645987 | 0.2000000 | 40 | )= | 3.962740 |
| dl( | 6.145987 | 0.2000000 | 40 | )= | 4.403044 |
| gama(beta = 0.2000000 | | alfa = 45) > | | 1.197197 | |
| | gama | beta | alfa | | |
| dl( | 1.197197 | 0.2000000 | 45 | )= | 0.0000000E + 00 |
| dl( | 1.697197 | 0.2000000 | 45 | )= | 0.3585786 |
| dl( | 2.197197 | 0.2000000 | 45 | )= | 0.7171574 |
| dl( | 2.697197 | 0.2000000 | 45 | )= | 1.075736 |
| dl( | 3.197197 | 0.2000000 | 45 | )= | 1.434315 |
| dl( | 3.697197 | 0.2000000 | 45 | )= | 1.792893 |
| dl( | 4.197197 | 0.2000000 | 45 | )= | 2.151472 |
| dl( | 4.697197 | 0.2000000 | 45 | )= | 2.510051 |
| dl( | 5.197197 | 0.2000000 | 45 | )= | 2.868629 |
| dl( | 5.697197 | 0.2000000 | 45 | )= | 3.227208 |
| dl( | 6.197197 | 0.2000000 | 45 | )= | 3.585786 |
| gama(beta = 0.2000000 | | alfa = 50) > | | 1.265059 | |
| | gama | beta | alfa | | |
| dl( | 1.265059 | 0.2000000 | 50 | )= | 0.0000000E + 00 |
| dl( | 1.765059 | 0.2000000 | 50 | )= | 0.2890092 |
| dl( | 2.265059 | 0.2000000 | 50 | )= | 0.5780182 |
| dl( | 2.765059 | 0.2000000 | 50 | )= | 0.8670272 |
| dl( | 3.265059 | 0.2000000 | 50 | )= | 1.156036 |
| dl( | 3.765059 | 0.2000000 | 50 | )= | 1.445045 |
| dl( | 4.265059 | 0.2000000 | 50 | )= | 1.734055 |
| dl( | 4.765059 | 0.2000000 | 50 | )= | 2.023064 |
| dl( | 5.265059 | 0.2000000 | 50 | )= | 2.312073 |
| dl( | 5.765059 | 0.2000000 | 50 | )= | 2.601082 |
| dl( | 6.265059 | 0.2000000 | 50 | )= | 2.890091 |
| gama(beta = 0.2000000 | | alfa = 55) > | | 1.359236 | |
| | gama | beta | alfa | | |
| dl( | 1.359236 | 0.2000000 | 55 | )= | 0.0000000E + 00 |
| dl( | 1.859236 | 0.2000000 | 55 | )= | 0.2280263 |
| dl( | 2.359236 | 0.2000000 | 55 | )= | 0.4560528 |
| dl( | 2.859236 | 0.2000000 | 55 | )= | 0.6840791 |
| dl( | 3.359236 | 0.2000000 | 55 | )= | 0.9121054 |
| dl( | 3.859236 | 0.2000000 | 55 | )= | 1.140132 |
| dl( | 4.359236 | 0.2000000 | 55 | )= | 1.368158 |
| dl( | 4.859236 | 0.2000000 | 55 | )= | 1.596184 |
| dl( | 5.359236 | 0.2000000 | 55 | )= | 1.824211 |
| dl( | 5.859236 | 0.2000000 | 55 | )= | 2.052237 |
| dl( | 6.359236 | 0.2000000 | 55 | )= | 2.280263 |
| gama(beta = 0.2000000 | | alfa = 60) > | | 1.500000 | |
| | gama | beta | alfa | | |
| dl( | 1.500000 | 0.2000000 | 5 | )= | 0.0000000E + 00 |
| dl( | 2.000000 | 0.2000000 | 60 | )= | 0.1732051 |
| dl( | 2.500000 | 0.2000000 | 60 | )= | 0.3464102 |
| dl( | 3.000000 | 0.2000000 | 60 | )= | 0.5196153 |
| dl( | 3.500000 | 0.2000000 | 60 | )= | 0.6928202 |
| dl( | 4.000000 | 0.2000000 | 60 | )= | 0.8660252 |
| dl( | 4.500000 | 0.2000000 | 60 | )= | 1.039230 |
| dl( | 5.000000 | 0.2000000 | 60 | )= | 1.212435 |
| dl( | 5.500000 | 0.2000000 | 60 | )= | 1.385640 |
| dl( | 6.000000 | 0.2000000 | 60 | )= | 1.558846 |
| dl( | 6.500000 | 0.2000000 | 60 | )= | 1.732051 |
| gama(beta = 0.2000000 | | alfa = 65) > | | 1.737939 | |
| | gama | beta | alfa | | |
| dl( | 1.000848 | 0.2000000 | 65 | )= | 0.0000000E + 00 |
| dl( | 2.237939 | 0.2000000 | 65 | )= | 0.1228161 |
| dl( | 2.737939 | 0.2000000 | 65 | )= | 0.2456321 |
| dl( | 3.237939 | 0.2000000 | 65 | )= | 0.3684481 |
| dl( | 3.737939 | 0.2000000 | 65 | )= | 0.4912642 |
| dl( | 4.237939 | 0.2000000 | 65 | )= | 0.6140803 |
| dl( | 4.737939 | 0.2000000 | 65 | )= | 0.7368963 |
| dl( | 5.237939 | 0.2000000 | 65 | )= | 0.8597122 |
| dl( | 5.737939 | 0.2000000 | 65 | )= | 0.9825283 |
| dl( | 6.237939 | 0.2000000 | 65 | )= | 1.105344 |
| dl( | 6.737939 | 0.2000000 | 65 | )= | 1.228161 |
| gama(beta = 0.2000000 | | alfa = 70) > | | 2.243517 | |
| | gama | beta | alfa | | |
| dl( | 2.243517 | 0.2000000 | 70 | )= | 0.0000000E + 00 |
| dl( | 2.743517 | 0.2000000 | 70 | )= | 7.5567380E − 02 |

TABLE 1-continued

Design Parameters for CSSC Tube Fitting, (d1 = $\Delta L/Re_p$).

| | | | | | |
|---|---|---|---|---|---|
| dl( | 3.243517 | 0.2000000 | 70 | )= | 0.1511347 |
| dl( | 3.743517 | 0.2000000 | 70 | )= | 0.2267021 |
| dl( | 4.243517 | 0.2000000 | 70 | )= | 0.3022694 |
| dl( | 4.743517 | 0.2000000 | 70 | )= | 0.3778368 |
| dl( | 5.243517 | 0.2000000 | 70 | )= | 0.4534041 |
| dl( | 5.743517 | 0.2000000 | 70 | )= | 0.5289715 |
| dl( | 6.243517 | 0.2000000 | 70 | )= | 0.6045388 |
| dl( | 6.743517 | 0.2000000 | 70 | )= | 0.6801062 |
| dl( | 7.243517 | 0.2000000 | 70 | )= | 0.7556735 |
| gama(beta = 0.2000000 | | alfa = 75) > | | | 4.172484 |
| | gama | beta | alfa | | |
| dl( | 4.172484 | 0.2000000 | 75 | )= | 0.0000000E + 00 |
| dl( | 4.672484 | 0.2000000 | 75 | )= | 3.0446989E − 02 |
| dl( | 5.172484 | 0.2000000 | 75 | )= | 6.0893979E − 02 |
| dl( | 5.672484 | 0.2000000 | 75 | )= | 9.1340967E − 02 |
| dl( | 6.172484 | 0.2000000 | 75 | )= | 0.1217880 |
| dl( | 6.672484 | 0.2000000 | 75 | )= | 0.1522349 |
| dl( | 7.172484 | 0.2000000 | 75 | )= | 0.1826819 |
| dl( | 7.672484 | 0.2000000 | 75 | )= | 0.2131289 |
| dl( | 8.172484 | 0.2000000 | 75 | )= | 0.2435759 |
| dl( | 8.672484 | 0.2000000 | 75 | )= | 0.2740229 |
| dl( | 9.172484 | 0.2000000 | 75 | )= | 0.3044699 |
| gama(beta = 0.3000000 | | alfa = 5) > | | | 1.003273 |
| | gama | beta | alfa | | |
| dl( | 1.003273 | 0.3000000 | 5 | )= | 0.0000000E + 00 |
| dl( | 1.503273 | 0.3000000 | 5 | )= | 3.993970 |
| dl( | 2.003273 | 0.3000000 | 5 | )= | 7.987939 |
| dl( | 2.503273 | 0.3000000 | 5 | )= | 11.98191 |
| dl( | 3.003273 | 0.3000000 | 5 | )= | 15.97588 |
| dl( | 3.503273 | 0.3000000 | 5 | )= | 19.96985 |
| dl( | 4.003273 | 0.3000000 | 5 | )= | 23.96382 |
| dl( | 4.503273 | 0.3000000 | 5 | )= | 27.95779 |
| dl( | 5.003273 | 0.3000000 | 5 | )= | 31.95176 |
| dl( | 5.503273 | 0.3000000 | 5 | )= | 35.94573 |
| dl( | 6.003273 | 0.3000000 | 5 | )= | 39.93970 |
| gama(beta = 0.3000000 | | alfa = 10) > | | | 1.013210 |
| | gama | beta | alfa | | |
| dl( | 1.013210 | 0.3000000 | 10 | )= | 0.0000000E + 00 |
| dl( | 1.513210 | 0.3000000 | 10 | )= | 1.971826 |
| dl( | 2.013210 | 0.3000000 | 10 | )= | 3.943652 |
| dl( | 2.513210 | 0.3000000 | 10 | )= | 5.915477 |
| dl( | 3.013210 | 0.3000000 | 10 | )= | 7.887302 |
| dl( | 3.513210 | 0.3000000 | 10 | )= | 9.859128 |
| dl( | 4.013210 | 0.3000000 | 10 | )= | 11.83095 |
| dl( | 4.513210 | 0.3000000 | 10 | )= | 13.80278 |
| dl( | 5.013210 | 0.3000000 | 10 | )= | 15.77460 |
| dl( | 5.513210 | 0.3000000 | 10 | )= | 17.74643 |
| dl( | 6.013210 | 0.3000000 | 10 | )= | 19.71825 |
| gama(beta = 0.3000000 | | alfa = 15) > | | | 1.030178 |
| | gama | beta | alfa | | |
| dl( | 1.030178 | 0.3000000 | 15 | )= | 0.0000000E + 00 |
| dl( | 1.530178 | 0.3000000 | 15 | )= | 1.286470 |
| dl( | 2.030178 | 0.3000000 | 15 | )= | 2.572940 |
| dl( | 2.530178 | 0.3000000 | 15 | )= | 3.859410 |
| dl( | 3.030178 | 0.3000000 | 15 | )= | 5.145880 |
| dl( | 3.530178 | 0.3000000 | 15 | )= | 6.432350 |
| dl( | 4.030178 | 0.3000000 | 15 | )= | 7.718821 |
| dl( | 4.530178 | 0.3000000 | 15 | )= | 9.005290 |
| dl( | 5.030178 | 0.3000000 | 15 | )= | 10.29176 |
| dl( | 5.530178 | 0.3000000 | 15 | )= | 11.57823 |
| dl( | 6.030178 | 0.3000000 | 15 | )= | 12.86470 |
| gama(beta = 0.3000000 | | alfa = 20) > | | | 1.054860 |
| | gama | beta | alfa | | |
| dl( | 1.054860 | 0.3000000 | 20 | )= | 0.0000000E + 00 |
| dl( | 1.554860 | 0.3000000 | 20 | )= | 0.9351683 |
| dl( | 2.054860 | 0.3000000 | 20 | )= | 1.870337 |
| dl( | 2.554860 | 0.3000000 | 20 | )= | 2.805505 |
| dl( | 3.054860 | 0.3000000 | 20 | )= | 3.740673 |
| dl( | 3.554860 | 0.3000000 | 20 | )= | 4.675841 |
| dl( | 4.054860 | 0.3000000 | 20 | )= | 5.611008 |
| dl( | 4.554860 | 0.3000000 | 20 | )= | 6.546177 |
| dl( | 5.054860 | 0.3000000 | 20 | )= | 7.481345 |
| dl( | 5.554860 | 0.3000000 | 20 | )= | 8.416512 |
| dl( | 6.054860 | 0.3000000 | 20 | )= | 9.351681 |
| gama(beta = 0.3000000 | | alfa = 25) > | | | 1.088374 |
| | gama | beta | alfa | | |
| dl( | 1.088374 | 0.3000000 | 25 | )= | 0.0000000E + 00 |
| dl( | 1.588374 | 0.3000000 | 25 | )= | 0.7173234 |
| dl( | 2.088374 | 0.3000000 | 25 | )= | 1.434647 |
| dl( | 2.588374 | 0.3000000 | 25 | )= | 2.151970 |
| dl( | 3.088374 | 0.3000000 | 25 | )= | 2.869293 |
| dl( | 3.588374 | 0.3000000 | 25 | )= | 3.586617 |
| dl( | 4.088374 | 0.3000000 | 25 | )= | 4.303940 |
| dl( | 4.588374 | 0.3000000 | 25 | )= | 5.021263 |
| dl( | 5.088374 | 0.3000000 | 25 | )= | 5.738586 |
| dl( | 5.588374 | 0.3000000 | 25 | )= | 6.455910 |
| dl( | 6.088374 | 0.3000000 | 25 | )= | 7.173233 |
| gama(beta = 0.3000000 | | alfa = 30) > | | | 1.132503 |
| | gama | beta | alfa | | |
| dl( | 1.132503 | 0.3000000 | 30 | )= | 0.0000000E + 00 |
| dl( | 1.632503 | 0.3000000 | 30 | )= | 0.5660253 |
| dl( | 2.132503 | 0.3000000 | 30 | )= | 1.132051 |
| dl( | 2.632503 | 0.3000000 | 30 | )= | 1.698076 |
| dl( | 3.132503 | 0.3000000 | 30 | )= | 2.264102 |
| dl( | 3.632503 | 0.3000000 | 30 | )= | 2.830127 |
| dl( | 4.132503 | 0.3000000 | 30 | )= | 3.396153 |
| dl( | 4.632503 | 0.3000000 | 30 | )= | 3.962178 |
| dl( | 5.132503 | 0.3000000 | 30 | )= | 4.528203 |
| dl( | 5.632503 | 0.3000000 | 30 | )= | 5.094229 |
| dl( | 6.132503 | 0.3000000 | 30 | )= | 5.660254 |
| gama(beta = 0.3000000 | | alfa = 35) > | | | 1.190112 |
| | gama | beta | alfa | | |
| dl( | 1.190112 | 0.3000000 | 35 | )= | 0.0000000E + 00 |
| dl( | 1.690112 | 0.3000000 | 35 | )= | 0.4525571 |
| dl( | 2.190112 | 0.3000000 | 35 | )= | 0.9051141 |
| dl( | 2.690112 | 0.3000000 | 35 | )= | 1.357671 |
| dl( | 3.190112 | 0.3000000 | 35 | )= | 1.810228 |
| dl( | 3.690112 | 0.3000000 | 35 | )= | 2.262785 |
| dl( | 4.190112 | 0.3000000 | 35 | )= | 2.715343 |
| dl( | 4.690112 | 0.3000000 | 35 | )= | 3.167900 |
| dl( | 5.190112 | 0.3000000 | 35 | )= | 3.620456 |
| dl( | 5.690112 | 0.3000000 | 35 | )= | 4.073013 |
| dl( | 6.190112 | 0.3000000 | 35 | )= | 4.525570 |
| gama(beta = 0.3000000 | | alfa = 40) > | | | 1.265968 |
| | gama | beta | alfa | | |
| dl( | 1.265968 | 0.3000000 | 40 | )= | 0.0000000E + 00 |
| dl( | 1.765968 | 0.3000000 | 40 | )= | 0.3625183 |
| dl( | 2.265968 | 0.3000000 | 40 | )= | 0.7250366 |
| dl( | 2.765968 | 0.3000000 | 40 | )= | 1.087555 |
| dl( | 3.265968 | 0.3000000 | 40 | )= | 1.450073 |
| dl( | 3.765968 | 0.3000000 | 40 | )= | 1.812591 |
| dl( | 4.265968 | 0.3000000 | 40 | )= | 2.175110 |
| dl( | 4.765968 | 0.3000000 | 40 | )= | 2.537628 |
| dl( | 5.265968 | 0.3000000 | 40 | )= | 2.900146 |
| dl( | 5.765968 | 0.3000000 | 40 | )= | 3.262665 |
| dl( | 6.265968 | 0.3000000 | 40 | )= | 3.625183 |
| gama(beta = 0.3000000 | | alfa = 45) > | | | 1.368454 |
| | gama | beta | alfa | | |
| dl( | 1.368454 | 0.3000000 | 5 | )= | 0.0000000E + 00 |
| dl( | 1.868454 | 0.3000000 | 45 | )= | 0.2878680 |
| dl( | 2.368454 | 0.3000000 | 45 | )= | 0.5757360 |
| dl( | 2.868454 | 0.3000000 | 45 | )= | 0.8636041 |
| dl( | 3.368454 | 0.3000000 | 45 | )= | 1.151472 |
| dl( | 3.868454 | 0.3000000 | 45 | )= | 1.439340 |
| dl( | 4.368454 | 0.3000000 | 45 | )= | 1.727208 |
| dl( | 4.868454 | 0.3000000 | 45 | )= | 2.015076 |
| dl( | 5.368454 | 0.3000000 | 45 | )= | 2.302944 |
| dl( | 5.868454 | 0.3000000 | 45 | )= | 2.590812 |
| dl( | 6.368454 | 0.3000000 | 45 | )= | 2.878680 |
| gama(beta = 0.3000000 | | alfa = 50) > | | | 1.513575 |
| | gama | beta | alfa | | |
| dl( | 1.513575 | 0.3000000 | 50 | )= | 0.0000000E + 00 |
| dl( | 2.013575 | 0.3000000 | 50 | )= | 0.2237388 |
| dl( | 2.513575 | 0.3000000 | 50 | )= | 0.4474775 |
| dl( | 3.013575 | 0.3000000 | 50 | )= | 0.6712162 |
| dl( | 3.513575 | 0.3000000 | 50 | )= | 0.8949549 |
| dl( | 4.013576 | 0.3000000 | 50 | )= | 1.118694 |
| dl( | 4.513576 | 0.3000000 | 50 | )= | 1.342432 |
| dl( | 5.013576 | 0.3000000 | 50 | )= | 1.566171 |
| dl( | 5.513576 | 0.3000000 | 50 | )= | 1.789910 |
| dl( | 6.013576 | 0.3000000 | 50 | )= | 2.013649 |
| dl( | 6.513576 | 0.3000000 | 50 | )= | 2.237387 |
| gama(beta = 0.3000000 | | alfa = 55) > | | | 1.735820 |
| | gama | beta | alfa | | |

TABLE 1-continued

Design Parameters for CSSC Tube Fitting, (d1 = ΔL/Re$_p$).

| | gama | beta | alfa | | |
|---|---|---|---|---|---|
| dl( | 1.735820 | 0.3000000 | 55 | )= | 0.0000000E + 00 |
| dl( | 2.235820 | 0.3000000 | 55 | )= | 0.1669876 |
| dl( | 2.735820 | 0.3000000 | 55 | )= | 0.3339752 |
| dl( | 3.235820 | 0.3000000 | 55 | )= | 0.5009628 |
| dl( | 3.735820 | 0.3000000 | 55 | )= | 0.6679505 |
| dl( | 4.235820 | 0.3000000 | 55 | )= | 0.8349380 |
| dl( | 4.735820 | 0.3000000 | 55 | )= | 1.001926 |
| dl( | 5.235820 | 0.3000000 | 55 | )= | 1.168913 |
| dl( | 5.735820 | 0.3000000 | 55 | )= | 1.335901 |
| dl( | 6.235820 | 0.3000000 | 55 | )= | 1.502888 |
| dl( | 6.735820 | 0.3000000 | 55 | )= | 1.669876 |
| gama(beta = 0.3000000 | | alfa = 60) > | | | 2.125000 |
| | gama | beta | alfa | | |
| dl( | 2.125000 | 0.3000000 | 60 | )= | 0.0000000E + 00 |
| dl( | 2.625000 | 0.3000000 | 60 | )= | 0.1154701 |
| dl) | 3.125000 | 0.3000000 | 60 | )= | 0.2309401 |
| dl( | 3.625000 | 0.3000000 | 60 | )= | 0.3464102 |
| dl( | 4.125000 | 0.3000000 | 60 | )= | 0.4618802 |
| dl( | 4.625000 | 0.3000000 | 60 | )= | 0.5773503 |
| dl( | 5.125000 | 0.3000000 | 60 | )= | 0.6928203 |
| dl( | 5.625000 | 0.3000000 | 60 | )= | 0.8082904 |
| dl( | 6.125000 | 0.3000000 | 60 | )= | 0.9237605 |
| dl( | 6.625000 | 0.3000000 | 60 | )= | 1.039231 |
| dl( | 7.125000 | 0.3000000 | 60 | )= | 1.154701 |
| gama(beta = 0.3000000 | | alfa = 65) > | | | 3.009636 |
| | gama | beta | alfa | | |
| dl( | 3.009636 | 0.3000000 | 65 | )= | 0.0000000E + 00 |
| dl( | 3.509636 | 0.3000000 | 65 | )= | 6.7647174E − 02 |
| dl( | 4.009636 | 0.3000000 | 65 | )= | 0.1352943 |
| dl( | 4.509636 | 0.3000000 | 65 | )= | 0.2029415 |
| dl( | 5.009636 | 0.3000000 | 65 | )= | 0.2705886 |
| dl( | 5.509636 | 0.3000000 | 65 | )= | 0.3382358 |
| dl( | 6.009636 | 0.3000000 | 65 | )= | 0.4058830 |
| dl( | 6.509636 | 0.3000000 | 65 | )= | 0.4735300 |
| dl( | 7.009636 | 0.3000000 | 65 | )= | 0.5411772 |
| dl( | 7.509636 | 0.3000000 | 65 | )= | 0.6088244 |
| dl( | 8.009637 | 0.3000000 | 65 | )= | 0.6764715 |
| gama(beta = 0.3000000 | | alfa = 70) > | | | 7.304273 |
| | gama | beta | alfa | | |
| dl( | 7.304273 | 0.3000000 | 70 | )= | 0.0000000E + 00 |
| dl( | 7.804273 | 0.3000000 | 70 | )= | 2.2358468E − 02 |
| dl( | 8.304274 | 0.3000000 | 70 | )= | 4.4716977E − 02 |
| dl( | 8.804274 | 0.3000000 | 70 | )= | 6.7075446E − 02 |
| dl( | 9.304274 | 0.3000000 | 70 | )= | 8.9433916E − 02 |
| dl( | 9.804274 | 0.3000000 | 70 | )= | 0.1117924 |
| dl( | 10.30427 | 0.3000000 | 70 | )= | 0.1341508 |
| dl( | 10.80427 | 0.3000000 | 70 | )= | 0.1565093 |
| dl( | 11.30427 | 0.3000000 | 70 | )= | 0.1788678 |
| dl( | 11.80427 | 0.3000000 | 70 | )= | 0.2012262 |
| dl( | 12.30427 | 0.3000000 | 70 | )= | 0.2235847 |
| gama(beta = 0.4000000 | | alfa = 5) > | | | 1.005096 |
| | gama | beta | alfa | | |
| dl( | 1.005096 | 0.4000000 | 5 | )= | 0.0000000E + 00 |
| dl( | 1.505096 | 0.4000000 | 5 | )= | 3.420284 |
| dl( | 2.005096 | 0.4000000 | 5 | )= | 6.840568 |
| dl( | 2.505096 | 0.4000000 | 5 | )= | 10.26085 |
| dl( | 3.005096 | 0.4000000 | 5 | )= | 13.68113 |
| dl( | 3.505096 | 0.4000000 | 5 | )= | 17.10142 |
| dl( | 4.005096 | 0.4000000 | 5 | )= | 20.52170 |
| dl( | 4.505096 | 0.4000000 | 5 | )= | 23.94199 |
| dl( | 5.005096 | 0.4000000 | 5 | )= | 27.36227 |
| dl( | 5.505096 | 0.4000000 | 5 | )= | 30.78255 |
| dl( | 6.005096 | 0.4000000 | 5 | )= | 34.20284 |
| gama(beta = 0.4000000 | | alfa = 10) > | | | 1.020625 |
| | gama | beta | alfa | | |
| dl( | 1.020625 | 0.4000000 | 10 | )= | 0.0000000E + 00 |
| dl( | 1.520625 | 0.4000000 | 10 | )= | 1.683887 |
| dl( | 2.020625 | 0.4000000 | 10 | )= | 3.367775 |
| dl( | 2.520625 | 0.4000000 | 10 | )= | 5.051661 |
| dl( | 3.020625 | 0.4000000 | 10 | )= | 6.735548 |
| dl( | 3.520625 | 0.4000000 | 10 | )= | 8.419435 |
| dl( | 4.020625 | 0.4000000 | 10 | )= | 10.10332 |
| dl( | 4.520625 | 0.4000000 | 10 | )= | 11.78721 |
| dl( | 5.020625 | 0.4000000 | 10 | )= | 13.47109 |
| dl( | 5.520625 | 0.4000000 | 10 | )= | 15.15498 |
| dl( | 6.020625 | 0.4000000 | 10 | )= | 16.83887 |
| gama(beta = 0.4000000 | | alfa = 15) > | | | 1.047347 |
| | gama | beta | alfa | | |
| dl( | 1.047347 | 0.4000000 | 15 | )= | 0.0000000E + 00 |
| dl( | 1.547347 | 0.4000000 | 15 | )= | 1.093285 |
| dl( | 2.047347 | 0.4000000 | 15 | )= | 2.186569 |
| dl( | 2.547347 | 0.4000000 | 15 | )= | 3.279854 |
| dl( | 3.047347 | 0.4000000 | 15 | )= | 4.373139 |
| dl( | 3.547347 | 0.4000000 | 15 | )= | 5.466424 |
| dl( | 4.047347 | 0.4000000 | 15 | )= | 6.559709 |
| dl( | 4.547347 | 0.4000000 | 15 | )= | 7.652993 |
| dl( | 5.047347 | 0.4000000 | 15 | )= | 8.746278 |
| dl( | 5.547347 | 0.4000000 | 15 | )= | 9.839563 |
| dl( | 6.047347 | 0.4000000 | 15 | )= | 10.93285 |
| gama(beta = 0.4000000 | | alfa = 20) > | | | 1.086700 |
| | gama | beta | alfa | | |
| dl( | 1.086700 | 0.4000000 | 20 | )= | 0.0000000E + 00 |
| dl( | 1.586700 | 0.4000000 | 20 | )= | 0.7889779 |
| dl( | 2.086700 | 0.4000000 | 20 | )= | 1.577956 |
| dl( | 2.586700 | 0.4000000 | 20 | )= | 2.366934 |
| dl( | 3.086700 | 0.4000000 | 20 | )= | 3.155912 |
| dl( | 3.586700 | 0.4000000 | 20 | )= | 3.944890 |
| dl( | 4.086699 | 0.4000000 | 20 | )= | 4.733867 |
| dl( | 4.586699 | 0.4000000 | 20 | )= | 5.522845 |
| dl( | 5.086699 | 0.4000000 | 20 | )= | 6.311823 |
| dl( | 5.586699 | 0.4000000 | 20 | )= | 7.100801 |
| dl( | 6.086699 | 0.4000000 | 20 | )= | 7.889779 |
| gama(beta = 0.4000000 | | alfa = 25) > | | | 1.141105 |
| | gama | beta | alfa | | |
| dl( | 1.141105 | 0.4000000 | 25 | )= | 0.0000000E + 00 |
| dl( | 1.641105 | 0.4000000 | 25 | )= | 0.5990134 |
| dl( | 2.141105 | 0.4000000 | 25 | )= | 1.198027 |
| dl( | 2.641105 | 0.4000000 | 25 | )= | 1.797040 |
| dl( | 3.141105 | 0.4000000 | 25 | )= | 2.396053 |
| dl( | 3.641105 | 0.4000000 | 25 | )= | 2.995066 |
| dl( | 4.141105 | 0.4000000 | 25 | )= | 3.594079 |
| dl( | 4.641105 | 0.4000000 | 25 | )= | 4.193092 |
| dl( | 5.141105 | 0.4000000 | 25 | )= | 4.792106 |
| dl( | 5.641105 | 0.4000000 | 25 | )= | 5.391119 |
| dl( | 6.141105 | 0.4000000 | 25 | )= | 5.990132 |
| gama(beta = 0.4000000 | | alfa = 30) > | | | 1.214581 |
| | gama | beta | alfa | | |
| dl( | 1.214581 | 0.4000000 | 30 | )= | 0.0000000E + 00 |
| dl( | 1.714581 | 0.4000000 | 30 | )= | 0.4660254 |
| dl( | 2.214581 | 0.4000000 | 30 | )= | 0.9320508 |
| dl( | 2.714581 | 0.4000000 | 30 | )= | 1.398076 |
| dl( | 3.214581 | 0.4000000 | 30 | )= | 1.864102 |
| dl( | 3.714581 | 0.4000000 | 30 | )= | 2.330127 |
| dl( | 4.214581 | 0.4000000 | 30 | )= | 2.796153 |
| dl( | 4.714581 | 0.4000000 | 30 | )= | 3.262178 |
| dl( | 5.214581 | 0.4000000 | 30 | )= | 3.728203 |
| dl( | 5.714581 | 0.4000000 | 30 | )= | 4.194229 |
| dl( | 6.214581 | 0.4000000 | 30 | )= | 4.660254 |
| gama(beta = 0.4000000 | | alfa = 35) > | | | 1.313958 |
| | gama | beta | alfa | | |
| dl( | 1.313958 | 0.4000000 | 35 | )= | 0.0000000E + 00 |
| dl( | 1.813958 | 0.4000000 | 35 | )= | 0.3653848 |
| dl( | 2.313958 | 0.4000000 | 35 | )= | 0.7307695 |
| dl( | 2.813958 | 0.4000000 | 35 | )= | 1.096154 |
| dl( | 3.313958 | 0.4000000 | 35 | )= | 1.461539 |
| dl( | 3.813958 | 0.4000000 | 35 | )= | 1.826923 |
| dl( | 4.313958 | 0.4000000 | 35 | )= | 2.192308 |
| dl( | 4.813958 | 0.4000000 | 35 | )= | 2.557693 |
| dl( | 5.313958 | 0.4000000 | 35 | )= | 2.923077 |
| dl( | 5.813958 | 0.4000000 | 35 | )= | 3.288462 |
| dl( | 6.313958 | 0.4000000 | 35 | )= | 3.653847 |
| gama(beta = 0.4000000 | | alfa = 40) > | | | 1.451504 |
| | gama | beta | alfa | | |
| dl( | 1.451504 | 0.4000000 | 40 | )= | 0.0000000E + 00 |
| dl( | 1.951504 | 0.4000000 | 40 | )= | 0.2847320 |
| dl( | 2.451504 | 0.4000000 | 40 | )= | 0.5694641 |
| dl( | 2.951504 | 0.4000000 | 40 | )= | 0.8541961 |
| dl( | 3.451504 | 0.4000000 | 40 | )= | 1.138928 |
| dl( | 3.951504 | 0.4000000 | 40 | )= | 1.423660 |
| dl( | 4.451504 | 0.4000000 | 40 | )= | 1.708392 |
| dl( | 4.951504 | 0.4000000 | 40 | )= | 1.993124 |
| dl( | 5.451504 | 0.4000000 | 40 | )= | 2.277856 |
| dl( | 5.951504 | 0.4000000 | 40 | )= | 2.562588 |
| dl( | 6.451504 | 0.4000000 | 40 | )= | 2.847321 |

TABLE 1-continued

Design Parameters for CSSC Tube Fitting, (d1 = ΔL/Re_p).

| | gama | beta | alfa | | |
|---|---|---|---|---|---|
| gama(beta = 0.4000000 | | alfa = 45) > | | | 1.651239 |
| dl( | 1.651239 | 0.4000000 | 45 | )= | 0.0000000E + 00 |
| dl( | 2.151239 | 0.4000000 | 45 | )= | 0.2171572 |
| dl( | 2.651239 | 0.4000000 | 45 | )= | 0.4343146 |
| dl( | 3.151239 | 0.4000000 | 45 | )= | 0.6514719 |
| dl( | 3.651239 | 0.4000000 | 45 | )= | 0.8686291 |
| dl( | 4.151239 | 0.4000000 | 45 | )= | 1.085786 |
| dl( | 4.651239 | 0.4000000 | 45 | )= | 1.302943 |
| dl( | 5.151239 | 0.4000000 | 45 | )= | 1.520101 |
| dl( | 5.651239 | 0.4000000 | 45 | )= | 1.737258 |
| dl( | 6.151239 | 0.4000000 | 45 | )= | 1.954415 |
| dl( | 6.651239 | 0.4000000 | 45 | )= | 2.171573 |
| gama(beta = 0.4000000 | | alfa = 50) > | | | 1.966811 |
| dl( | 1.966811 | 0.4000000 | 50 | )= | 0.0000000E + 00 |
| dl( | 2.466811 | 0.4000000 | 50 | )= | 0.1584684 |
| dl( | 2.966811 | 0.4000000 | 50 | )= | 0.3169367 |
| dl( | 3.466811 | 0.4000000 | 50 | )= | 0.4754050 |
| dl( | 3.966811 | 0.4000000 | 50 | )= | 0.6338733 |
| dl( | 4.466811 | 0.4000000 | 50 | )= | 0.7923417 |
| dl( | 4.966811 | 0.4000000 | 50 | )= | 0.9508100 |
| dl( | 5.466811 | 0.4000000 | 50 | )= | 1.109279 |
| dl( | 5.966811 | 0.4000000 | 50 | )= | 1.267747 |
| dl( | 6.466811 | 0.4000000 | 50 | )= | 1.426215 |
| dl( | 6.966811 | 0.4000000 | 50 | )= | 1.584683 |
| gama(beta = 0.4000000 | | alfa = 55) > | | | 2.546316 |
| dl( | 2.546316 | 0.4000000 | 55 | )= | 0.0000000E + 00 |
| dl( | 3.046316 | 0.4000000 | 55 | )= | 0.1059489 |
| dl( | 3.546316 | 0.4000000 | 55 | )= | 0.2118977 |
| dl( | 4.046316 | 0.4000000 | 55 | )= | 0.3178467 |
| dl( | 4.546316 | 0.4000000 | 55 | )= | 0.4237956 |
| dl( | 5.046316 | 0.4000000 | 55 | )= | 0.5297443 |
| dl( | 5.546316 | 0.4000000 | 55 | )= | 0.6356933 |
| dl( | 6.046316 | 0.4000000 | 55 | )= | 0.7416422 |
| dl( | 6.546316 | 0.4000000 | 55 | )= | 0.8475911 |
| dl( | 7.046316 | 0.4000000 | 55 | )= | 0.9535400 |
| dl( | 7.546316 | 0.4000000 | 55 | )= | 1.059489 |
| gama(beta = 0.4000000 | | alfa = 60) > | | | 4.000001 |
| dl( | 1.000848 | 0.4000000 | 5 | )= | 0.0000000E + 00 |
| dl( | 4.500001 | 0.4000000 | 60 | )= | 5.7735037E − 02 |
| dl( | 5.000001 | 0.4000000 | 60 | )= | 0.1154700 |
| dl( | 5.500001 | 0.4000000 | 60 | )= | 0.1732050 |
| dl( | 6.000001 | 0.4000000 | 60 | )= | 0.2309400 |
| dl( | 6.500001 | 0.4000000 | 60 | )= | 0.2886750 |
| dl( | 7.000001 | 0.4000000 | 60 | )= | 0.3464100 |
| dl( | 7.500001 | 0.4000000 | 60 | )= | 0.4041451 |
| dl( | 8.000002 | 0.4000000 | 60 | )= | 0.4618801 |
| dl( | 8.500002 | 0.4000000 | 60 | )= | 0.5196151 |
| dl( | 9.000002 | 0.4000000 | 60 | )= | 0.5773501 |
| gama(beta = 0.4000000 | | alfa = 65) > | | | 15.52622 |
| dl( | 15.52622 | 0.4000000 | 65 | )= | 0.0000000E + 00 |
| dl( | 16.02622 | 0.4000000 | 65 | )= | 1.2478273E − 02 |
| dl( | 16.52622 | 0.4000000 | 65 | )= | 2.4956491E − 02 |
| dl( | 17.02622 | 0.4000000 | 65 | )= | 3.7434764E − 02 |
| dl( | 17.52622 | 0.4000000 | 65 | )= | 4.9912982E − 02 |
| dl( | 18.02622 | 0.4000000 | 65 | )= | 6.2391199E − 02 |
| dl( | 18.52622 | 0.4000000 | 65 | )= | 7.4869417E − 02 |
| dl( | 19.02622 | 0.4000000 | 65 | )= | 8.7347694E − 02 |
| dl( | 19.52622 | 0.4000000 | 65 | )= | 9.9825911E − 02 |
| dl( | 20.02622 | 0.4000000 | 65 | )= | 0.1123041 |
| dl( | 20.52622 | 0.4000000 | 65 | )= | 0.1247824 |
| gama(beta = 0.5000000 | | alfa = 5) > | | | 1.007654 |
| dl( | 1.007654 | 0.5000000 | 5 | )= | 0.0000000E + 00 |
| dl( | 1.507654 | 0.5000000 | 5 | )= | 2.846598 |
| dl( | 2.007654 | 0.5000000 | 5 | )= | 5.693197 |
| dl( | 2.507654 | 0.5000000 | 5 | )= | 8.539796 |
| dl( | 3.007654 | 0.5000000 | 5 | )= | 11.38639 |
| dl( | 3.507654 | 0.5000000 | 5 | )= | 14.23299 |
| dl( | 4.007654 | 0.5000000 | 5 | )= | 17.07959 |
| dl( | 4.507654 | 0.5000000 | 5 | )= | 19.92619 |
| dl( | 5.007654 | 0.5000000 | 5 | )= | 22.77279 |
| dl( | 5.507654 | 0.5000000 | 5 | )= | 25.61938 |
| dl( | 6.007654 | 0.5000000 | 5 | )= | 28.46598 |
| gama(beta = 0.5000000 | | alfa = 10) > | | | 1.031099 |
| dl( | 1.031099 | 0.5000000 | 5 | )= | 0.0000000E + 00 |
| dl( | 1.531099 | 0.5000000 | 10 | )= | 1.395948 |
| dl( | 2.031099 | 0.5000000 | 10 | )= | 2.791897 |
| dl( | 2.531099 | 0.5000000 | 10 | )= | 4.187845 |
| dl( | 3.031099 | 0.5000000 | 10 | )= | 5.583793 |
| dl( | 3.531099 | 0.5000000 | 10 | )= | 6.979742 |
| dl( | 4.031099 | 0.5000000 | 10 | )= | 8.375691 |
| dl( | 4.531099 | 0.5000000 | 10 | )= | 9.771640 |
| dl( | 5.031099 | 0.5000000 | 10 | )= | 11.16759 |
| dl( | 5.531099 | 0.5000000 | 10 | )= | 12.56354 |
| dl( | 6.031099 | 0.5000000 | 10 | )= | 13.95948 |
| gama(beta = 0.5000000 | | alfa = 15) > | | | 1.071886 |
| dl( | 1.071886 | 0.5000000 | 15 | )= | 0.0000000E + 00 |
| dl( | 1.571886 | 0.5000000 | 15 | )= | 0.9000998 |
| dl( | 2.071886 | 0.5000000 | 15 | )= | 1.800200 |
| dl( | 2.571886 | 0.5000000 | 15 | )= | 2.700299 |
| dl( | 3.071886 | 0.5000000 | 15 | )= | 3.600399 |
| dl( | 3.571886 | 0.5000000 | 15 | )= | 4.500498 |
| dl( | 4.071886 | 0.5000000 | 15 | )= | 5.400597 |
| dl( | 4.571886 | 0.5000000 | 15 | )= | 6.300696 |
| dl( | 5.071886 | 0.5000000 | 15 | )= | 7.200796 |
| dl( | 5.571886 | 0.5000000 | 15 | )= | 8.100896 |
| dl( | 6.071886 | 0.5000000 | 15 | )= | 9.000996 |
| gama(beta = 0.5000000 | | alfa = 20) > | | | 1.133022 |
| dl( | 1.133022 | 0.5000000 | 20 | )= | 0.0000000E + 00 |
| dl( | 1.633022 | 0.5000000 | 20 | )= | 0.6427878 |
| dl( | 2.133022 | 0.5000000 | 20 | )= | 1.285576 |
| dl( | 2.633022 | 0.5000000 | 20 | )= | 1.928363 |
| dl( | 3.133022 | 0.5000000 | 20 | )= | 2.571151 |
| dl( | 3.633022 | 0.5000000 | 20 | )= | 3.213938 |
| dl( | 4.133022 | 0.5000000 | 20 | )= | 3.856726 |
| dl( | 4.633022 | 0.5000000 | 20 | )= | 4.499513 |
| dl( | 5.133022 | 0.5000000 | 20 | )= | 5.142301 |
| dl( | 5.633022 | 0.5000000 | 20 | )= | 5.785089 |
| dl( | 6.133022 | 0.5000000 | 20 | )= | 6.427876 |
| gama(beta = 0.5000000 | | alfa = 25) > | | | 1.219792 |
| dl( | 1.219792 | 0.5000000 | 25 | )= | 0.0000000E + 00 |
| dl( | 1.719792 | 0.5000000 | 25 | )= | 0.4807031 |
| dl( | 2.219792 | 0.5000000 | 25 | )= | 0.9614062 |
| dl( | 2.719792 | 0.5000000 | 25 | )= | 1.442109 |
| dl( | 3.219792 | 0.5000000 | 25 | )= | 1.922812 |
| dl( | 3.719792 | 0.5000000 | 25 | )= | 2.403515 |
| dl( | 4.219792 | 0.5000000 | 25 | )= | 2.884219 |
| dl( | 4.719792 | 0.5000000 | 25 | )= | 3.364922 |
| dl( | 5.219792 | 0.5000000 | 25 | )= | 3.845624 |
| dl( | 5.719792 | 0.5000000 | 25 | )= | 4.326327 |
| dl( | 6.219792 | 0.5000000 | 25 | )= | 4.807031 |
| gama(beta = 0.5000000 | | alfa = 30) > | | | 1.341506 |
| dl( | 1.341506 | 0.5000000 | 30 | )= | 0.0000000E + 00 |
| dl( | 1.841506 | 0.5000000 | 30 | )= | 0.3660255 |
| dl( | 2.341506 | 0.5000000 | 30 | )= | 0.7320511 |
| dl( | 2.841506 | 0.5000000 | 30 | )= | 1.098076 |
| dl( | 3.341506 | 0.5000000 | 30 | )= | 1.464102 |
| dl( | 3.841506 | 0.5000000 | 30 | )= | 1.830127 |
| dl( | 4.341506 | 0.5000000 | 30 | )= | 2.196153 |
| dl( | 4.841506 | 0.5000000 | 30 | )= | 2.562178 |
| dl( | 5.341506 | 0.5000000 | 30 | )= | 2.928203 |
| dl( | 5.841506 | 0.5000000 | 30 | )= | 3.294229 |
| dl( | 6.341506 | 0.5000000 | 30 | )= | 3.660254 |
| gama(beta = 0.5000000 | | alfa = 35) > | | | 1.515412 |
| dl( | 1.515412 | 0.5000000 | 35 | )= | 0.0000000E + 00 |
| dl( | 2.015413 | 0.5000000 | 35 | )= | 0.2782125 |
| dl( | 2.515413 | 0.5000000 | 35 | )= | 0.5564247 |
| dl( | 3.015413 | 0.5000000 | 35 | )= | 0.8346372 |
| dl( | 3.515413 | 0.5000000 | 35 | )= | 1.112849 |
| dl( | 4.015412 | 0.5000000 | 35 | )= | 1.391062 |
| dl( | 4.515412 | 0.5000000 | 35 | )= | 1.669274 |
| dl( | 5.015412 | 0.5000000 | 35 | )= | 1.947486 |

TABLE 1-continued

Design Parameters for CSSC Tube Fitting, (d1 = ΔL/R$\epsilon_p$).

| | gama | beta | alfa | | |
|---|---|---|---|---|---|
| dl( | 5.515412 | 0.5000000 | 35 | )= | 2.225699 |
| dl( | 6.015412 | 0.5000000 | 35 | )= | 2.503911 |
| dl( | 6.515412 | 0.5000000 | 35 | )= | 2.782123 |
| gama(beta = 0.5000000 | | alfa = 40) > | | | 1.776517 |
| | gama | beta | alfa | | |
| dl( | 1.776517 | 0.5000000 | 40 | )= | 0.0000000E + 00 |
| dl( | 2.276517 | 0.5000000 | 40 | )= | 0.2069459 |
| dl( | 2.776517 | 0.5000000 | 40 | )= | 0.4138919 |
| dl( | 3.276517 | 0.5000000 | 40 | )= | 0.6208376 |
| dl( | 3.776517 | 0.5000000 | 40 | )= | 0.8277834 |
| dl( | 4.276517 | 0.5000000 | 40 | )= | 1.034729 |
| dl( | 4.776517 | 0.5000000 | 40 | )= | 1.241675 |
| dl( | 5.276517 | 0.5000000 | 40 | )= | 1.448621 |
| dl( | 5.776517 | 0.5000000 | 40 | )= | 1.655567 |
| dl( | 6.276517 | 0.5000000 | 40 | )= | 1.862513 |
| dl( | 6.776517 | 0.5000000 | 40 | )= | 2.069459 |
| gama(beta = 0.5000000 | | alfa = 45) > | | | 2.207107 |
| | gama | beta | alfa | | |
| dl( | 2.207107 | 0.5000000 | 45 | )= | 0.0000000E + 00 |
| dl( | 2.707107 | 0.5000000 | 45 | )= | 0.1464467 |
| dl( | 3.207107 | 0.5000000 | 45 | )= | 0.2928933 |
| dl( | 3.707107 | 0.5000000 | 45 | )= | 0.4393399 |
| dl( | 4.207107 | 0.5000000 | 45 | )= | 0.5857866 |
| dl( | 4.707107 | 0.5000000 | 45 | )= | 0.7322332 |
| dl( | 5.207107 | 0.5000000 | 45 | )= | 0.8786799 |
| dl( | 5.707107 | 0.5000000 | 45 | )= | 1.025126 |
| dl( | 6.207107 | 0 5000000 | 45 | )= | 1.171573 |
| dl( | 6.707107 | 0.5000000 | 45 | )= | 1.318020 |
| dl( | 7.207107 | 0.5000000 | 45 | )= | 1.464466 |
| gama(beta = 0.5000000 | | alfa = 50) > | | | 3.054885 |
| | gama | beta | alfa | | |
| dl( | 3.054885 | 0.5000000 | 50 | )= | 0.0000000E + 00 |
| dl( | 3.554885 | 0.5000000 | 50 | )= | 9.3198024E - 02 |
| dl( | 4.054885 | 0.5000000 | 50 | )= | 0.1863960 |
| dl( | 4.554885 | 0.5000000 | 50 | )= | 0.2795941 |
| dl( | 5.054885 | 0.5000000 | 50 | )= | 0.3727920 |
| dl( | 5.554885 | 0.5000000 | 50 | )= | 0.4659900 |
| dl( | 6.054885 | 0.5000000 | 50 | )= | 0.5591879 |
| dl( | 6.554885 | 0.5000000 | 50 | )= | 0.6523860 |
| dl( | 7.054885 | 0.5000000 | 50 | )= | 0.7455839 |
| dl( | 7.554885 | 0.5000000 | 50 | )= | 0.8387819 |
| dl( | 8.054885 | 0.5000000 | 50 | )= | 0.9319797 |
| gama(beta = 0.5000000 | | alfa = 55) > | | | 5.559950 |
| | gama | beta | alfa | | |
| dl( | 5.559950 | 0.5000000 | 55 | )= | 0.0000000E + 00 |
| dl( | 6.059950 | 0.5000000 | 55 | )= | 4.4910204E - 02 |
| dl( | 6.559950 | 0.5000000 | 55 | )= | 8.9820325E - 02 |
| dl( | 7.059950 | 0.5000000 | 55 | )= | 0.1347304 |
| dl( | 7.559950 | 0.5000000 | 55 | )= | 0.1796406 |
| dl( | 8.059951 | 0.5000000 | 55 | )= | 0.2245508 |
| dl( | 8.559951 | 0.5000000 | 55 | )= | 0.2694609 |
| dl( | 9.059951 | 0.5000000 | 55 | )= | 0.3143710 |
| dl( | 9.559951 | 0.5000000 | 55 | )= | 0.3592812 |
| dl( | 10.05995 | 0.5000000 | 55 | )= | 0.4041913 |
| dl( | 10.55995 | 0.5000000 | 55 | )= | 0.4491014 |
| gama(beta = 0.6000000 | | alfa = 5) > | | | 1.011504 |
| | gama | beta | alfa | | |
| dl( | 1.011504 | 0.6000000 | 5 | )= | 0.0000000E + 00 |
| dl( | 1.511504 | 0.6000000 | 5 | )= | 2.272913 |
| dl( | 2.011504 | 0.6000000 | 5 | )= | 4.545825 |
| dl( | 2.511504 | 0.6000000 | 5 | )= | 6.818738 |
| dl( | 3.011504 | 0.6000000 | 5 | )= | 9.091650 |
| dl( | 3.511504 | 0.6000000 | 5 | )= | 11.36456 |
| dl( | 4.011504 | 0.6000000 | 5 | )= | 13.63748 |
| dl( | 4.511504 | 0.6000000 | 5 | )= | 15.91039 |
| dl( | 5.011504 | 0.6000000 | 5 | )= | 18.18330 |
| dl( | 5.511504 | 0.6000000 | 5 | )= | 20.45621 |
| dl( | 6.011504 | 0.6000000 | 5 | )= | 22.72912 |
| gama(beta = 0.6000000 | | alfa = 10) > | | | 1.047016 |
| | gama | beta | alfa | | |
| dl( | 1.047016 | 0.6000000 | 10 | )= | 0.0000000E + 00 |
| dl( | 1.547016 | 0.6000000 | 10 | )= | 1.108010 |
| dl( | 2.047016 | 0.6000000 | 10 | )= | 2.216020 |
| dl( | 2.547016 | 0.6000000 | 10 | )= | 3.324029 |
| dl( | 3.047016 | 0.6000000 | 10 | )= | 4.432040 |
| dl( | 3.547016 | 0.6000000 | 10 | )= | 5.540050 |
| dl( | 4.047016 | 0.6000000 | 10 | )= | 6.648058 |
| dl( | 4.547016 | 0.6000000 | 10 | )= | 7.756068 |
| dl( | 5.047016 | 0.6000000 | 10 | )= | 8.864079 |
| dl( | 5.547016 | 0.6000000 | 10 | )= | 9.972089 |
| dl( | 6.047016 | 0.6000000 | 10 | )= | 11.08010 |
| gama(beta = 0.6000000 | | alfa = 15) > | | | 1.109838 |
| | gama | beta | alfa | | |
| dl( | 1.109838 | 0.6000000 | 15 | )= | 0.0000000E + 00 |
| dl( | 1.609838 | 0.6000000 | 15 | )= | 0.7069143 |
| dl( | 2.109838 | 0.6000000 | 15 | )= | 1.413829 |
| dl( | 2.609838 | 0.6000000 | 15 | )= | 2.120744 |
| dl( | 3.109838 | 0.6000000 | 15 | )= | 2.827658 |
| dl( | 3.609838 | 0.6000000 | 15 | )= | 3.534573 |
| dl( | 4.109838 | 0.6000000 | 15 | )= | 4.241487 |
| dl( | 4.609838 | 0.6000000 | 15 | )= | 4.948401 |
| dl( | 5.109838 | 0.6000000 | 15 | )= | 5.655315 |
| dl( | 5.609838 | 0.6000000 | 15 | )= | 6.362230 |
| dl( | 6.109838 | 0.6000000 | 15 | )= | 7.069144 |
| gama(beta = 0.6000000 | | alfa = 20) > | | | 1.206618 |
| | gama | beta | alfa | | |
| dl( | 1.206618 | 0.6000000 | 20 | )= | 0.0000000E + 00 |
| dl( | 1.706618 | 0.6000000 | 20 | )= | 0.4965974 |
| dl( | 2.206618 | 0.6000000 | 20 | )= | 0.9931949 |
| dl( | 2.706618 | 0.6000000 | 20 | )= | 1.489792 |
| dl( | 3.206618 | 0.6000000 | 20 | )= | 1.986390 |
| dl( | 3.706618 | 0.6000000 | 20 | )= | 2.482987 |
| dl( | 4.206618 | 0.6000000 | 20 | )= | 2.979584 |
| dl( | 4.706618 | 0.6000000 | 20 | )= | 3.476182 |
| dl( | 5.206618 | 0.6000000 | 20 | )= | 3.972780 |
| dl( | 5.706618 | 0.6000000 | 20 | )= | 4.469377 |
| dl( | 6.206618 | 0.6000000 | 20 | )= | 4.965974 |
| gama(beta = 0.6000000 | | alfa = 25) > | | | 1.349856 |
| | gama | beta | alfa | | |
| dl( | 1.349856 | 0.6000000 | 25 | )= | 0.0000000E + 00 |
| dl( | 1.849856 | 0.6000000 | 25 | )= | 0.3623931 |
| dl( | 2.349856 | 0.6000000 | 25 | )= | 0.7247862 |
| dl( | 2.849856 | 0.6000000 | 25 | )= | 1.087179 |
| dl( | 3.349856 | 0.6000000 | 25 | )= | 1.449572 |
| dl( | 3.849856 | 0.6000000 | 25 | )= | 1.811965 |
| dl( | 4.349856 | 0.6000000 | 25 | )= | 2.174359 |
| dl( | 4.849856 | 0.6000000 | 25 | )= | 2.536751 |
| dl( | 5.349856 | 0.6000000 | 25 | )= | 2.899144 |
| dl( | 5.849856 | 0.6000000 | 25 | )= | 3.261538 |
| dl( | 6.349856 | 0.6000000 | 25 | )= | 3.623930 |
| gama(beta = 0.6000000 | | alfa = 30) > | | | 1.563856 |
| | gama | beta | alfa | | |
| dl( | 1.563856 | 0.6000000 | 30 | )= | 0.0000000E + 00 |
| dl( | 2.063856 | 0.6000000 | 30 | )= | 0.2660254 |
| dl( | 2.563856 | 0.6000000 | 30 | )= | 0.5320508 |
| dl( | 3.063856 | 0.6000000 | 30 | )= | 0.7980763 |
| dl( | 3.563856 | 0.6000000 | 30 | )= | 1.064102 |
| dl( | 4.063856 | 0.6000000 | 30 | )= | 1.330127 |
| dl( | 4.563856 | 0.6000000 | 30 | )= | 1.596153 |
| dl( | 5.063856 | 0.6000000 | 30 | )= | 1.862178 |
| dl( | 5.563856 | 0.6000000 | 30 | )= | 2.128203 |
| dl( | 6.063856 | 0.6000000 | 30 | )= | 2.394229 |
| dl( | 6.563856 | 0.6000000 | 30 | )= | 2.660254 |
| gama(beta = 0.6000000 | | alfa = 35) > | | | 1.900716 |
| | gama | beta | alfa | | |
| dl( | 1.900716 | 0.6000000 | 35 | )= | 0.0000000E + 00 |
| dl( | 2.400717 | 0.6000000 | 35 | )= | 0.1910401 |
| dl( | 2.900717 | 0.6000000 | 35 | )= | 0.3820800 |
| dl( | 3.400717 | 0.6000000 | 35 | )= | 0.5731202 |
| dl( | 3.900717 | 0.6000000 | 35 | )= | 0.7641601 |
| dl( | 4.400716 | 0.6000000 | 35 | )= | 0.9552000 |
| dl( | 4.900716 | 0.6000000 | 35 | )= | 1.146240 |
| dl( | 5.400716 | 0.6000000 | 35 | )= | 1.337280 |
| dl( | 5.900716 | 0.6000000 | 35 | )= | 1.528320 |
| dl( | 6.400716 | 0.6000000 | 35 | )= | 1.719360 |
| dl( | 6.900716 | 0.6000000 | 35 | )= | 1.910400 |
| gama(beta = 0.6000000 | | alfa = 40) > | | | 2.493007 |
| | gama | beta | alfa | | |
| dl( | 2.493007 | 0.6000000 | 40 | )= | 0.0000000E + 00 |
| dl( | 2.993007 | 0.6000000 | 40 | )= | 0.1291597 |
| dl( | 3.493007 | 0.6000000 | 40 | )= | 0.2583195 |
| dl( | 3.993007 | 0.6000000 | 40 | )= | 0.3874791 |
| dl( | 4.493007 | 0.6000000 | 40 | )= | 0.5166388 |
| dl( | 4.993007 | 0.6000000 | 40 | )= | 0.6457986 |

TABLE 1-continued

Design Parameters for CSSC Tube Fitting, $(d1 = \Delta L/R\epsilon_p)$.

| | gama | beta | alfa | | |
|---|---|---|---|---|---|
| dl( | 5.493007 | 0.6000000 | 40 | )= | 0.7749582 |
| dl( | 5.993007 | 0.6000000 | 40 | )= | 0.9041179 |
| dl( | 6.493007 | 0.6000000 | 40 | )= | 1.033278 |
| dl( | 6.993007 | 0.6000000 | 40 | )= | 1.162437 |
| dl( | 7.493007 | 0.6000000 | 40 | )= | 1.291597 |
| gama(beta = 0.6000000 | | alfa = 45) > | | | 3.800942 |
| | gama | beta | alfa | | |
| dl( | 3.800942 | 0.6000000 | 45 | )= | 0.0000000E + 00 |
| d1) | 4.300942 | 0.6000000 | 45 | )= | 7.5736046E − 02 |
| dl( | 4.800942 | 0.6000000 | 45 | )= | 0.1514720 |
| dl( | 5.300942 | 0.6000000 | 45 | )= | 0.2272079 |
| dl( | 5.800942 | 0.6000000 | 45 | )= | 0.3029439 |
| dl( | 6.300942 | 0.6000000 | 45 | )= | 0.3786799 |
| dl( | 6.800942 | 0.6000000 | 45 | )= | 0.4544158 |
| dl( | 7.300942 | 0.6000000 | 45 | )= | 0.5301518 |
| dl( | 7.800942 | 0.6000000 | 45 | )= | 0.6058878 |
| dl( | 8.300942 | 0.6000000 | 45 | )= | 0.6816237 |
| dl( | 8.800942 | 0.6000000 | 45 | )= | 0.7573596 |
| gama(beta = 0.6000000 | | alfa = 50) > | | | 9.228890 |
| | gama | beta | alfa | | |
| dl( | 9.228890 | 0.6000000 | 50 | )= | 0.0000000E + 00 |
| dl( | 9.728890 | 0.6000000 | 50 | )= | 2.7927648E − 02 |
| dl( | 10.22889 | 0.6000000 | 50 | )= | 5.5855297E − 02 |
| dl( | 10.72889 | 0.6000000 | 50 | )= | 8.3782844E − 02 |
| dl( | 11.22889 | 0.6000000 | 50 | )= | 0.1117105 |
| dl( | 11.72889 | 0.6000000 | 50 | )= | 0.1396381 |
| dl( | 12.22889 | 0.6000000 | 50 | )= | 0.1675658 |
| dl( | 12.72889 | 0.6000000 | 50 | )= | 0.1954933 |
| dl( | 13.22889 | 0.6000000 | 50 | )= | 0.2234210 |
| dl( | 13.72889 | 0.6000000 | 50 | )= | 0.2513486 |
| dl( | 14.22889 | 0.6000000 | 50 | )= | 0.2792763 |
| gama(beta = 0.7000000 | | alfa = 5) > | | | 1.017952 |
| | gama | beta | alfa | | |
| dl( | 1.017952 | 0.7000000 | 5 | )= | 0.0000000E + 00 |
| dl( | 1.517952 | 0.7000000 | 5 | )= | 1.699228 |
| dl( | 2.017952 | 0.7000000 | 5 | )= | 3.398454 |
| dl( | 2.517952 | 0.7000000 | 5 | )= | 5.097681 |
| dl( | 3.017952 | 0.7000000 | 5 | )= | 6.796908 |
| dl( | 3.517952 | 0.7000000 | 5 | )= | 8.496135 |
| dl( | 4.017952 | 0.7000000 | 5 | )= | 10.19536 |
| dl( | 4.517952 | 0.7000000 | 5 | )= | 11.89459 |
| dl( | 5.017952 | 0.7000000 | 5 | )= | 13.59381 |
| dl( | 5.517952 | 0.7000000 | 5 | )= | 15.29304 |
| dl( | 6.017952 | 0.7000000 | 5 | )= | 16.99227 |
| gama(beta = 0.7000000 | | alfa = 10) > | | | 1.074112 |
| | gama | beta | alfa | | |
| dl( | 1.074112 | 0.7000000 | 10 | )= | 0.0000000E + 00 |
| dl( | 1.574112 | 0.7000000 | 10 | )= | 0.8200716 |
| dl( | 2.074112 | 0.7000000 | 10 | )= | 1.640143 |
| dl( | 2.574112 | 0.7000000 | 10 | )= | 2.460214 |
| dl( | 3.074112 | 0.7000000 | 10 | )= | 3.280286 |
| dl( | 3.574112 | 0.7000000 | 10 | )= | 4.100357 |
| dl( | 4.074112 | 0.7000000 | 10 | )= | 4.920428 |
| dl( | 4.574112 | 0.7000000 | 10 | )= | 5.740499 |
| dl( | 5.074112 | 0.7000000 | 10 | )= | 6.560570 |
| dl( | 5.574112 | 0.7000000 | 10 | )= | 7.380642 |
| dl( | 6.074112 | 0.7000000 | 10 | )= | 8.200713 |
| gama(beta = 0.7000000 | | alfa = 15) > | | | 1.176332 |
| | gama | beta | alfa | | |
| dl( | 1.176332 | 0.7000000 | 15 | )= | 0.0000000E + 00 |
| dl( | 1.676332 | 0.7000000 | 15 | )= | 0.5137293 |
| dl( | 2.176332 | 0.7000000 | 15 | )= | 1.027459 |
| dl( | 2.676332 | 0.7000000 | 15 | )= | 1.541188 |
| dl( | 3.176332 | 0.7000000 | 15 | )= | 2.054917 |
| dl( | 3.676332 | 0.7000000 | 15 | )= | 2.568646 |
| dl( | 4.176332 | 0.7000000 | 15 | )= | 3.082376 |
| dl( | 4.676332 | 0.7000000 | 15 | )= | 3.596105 |
| dl( | 5.176332 | 0.7000000 | 15 | )= | 4.109834 |
| dl( | 5.676332 | 0.7000000 | 15 | )= | 4.623564 |
| dl( | 6.176332 | 0.7000000 | 15 | )= | 5.137293 |
| gama(beta = 0.7000000 | | alfa = 20) > | | | 1.341623 |
| | gama | beta | alfa | | |
| dl( | 1.341623 | 0.7000000 | 20 | )= | 0.0000000E + 00 |
| dl( | 1.841623 | 0.7000000 | 20 | )= | 0.3504074 |
| dl( | 2.341623 | 0.7000000 | 20 | )= | 0.7008147 |
| dl( | 2.841623 | 0.7000000 | 20 | )= | 1.051222 |
| dl( | 3.341623 | 0.7000000 | 20 | )= | 1.401629 |
| dl( | 3.841623 | 0.7000000 | 20 | )= | 1.752036 |
| dl( | 4.341623 | 0.7000000 | 20 | )= | 2.102443 |
| dl( | 4.841623 | 0.7000000 | 20 | )= | 2.452851 |
| dl( | 5.341623 | 0.7000000 | 20 | )= | 2.803258 |
| dl( | 5.841623 | 0.7000000 | 20 | )= | 3.153665 |
| dl( | 6.341623 | 0.7000000 | 20 | )= | 3.504072 |
| gama(beta = 0.7000000 | | alfa = 25) > | | | 1.606009 |
| | gama | beta | alfa | | |
| dl( | 1.606009 | 0.7000000 | 25 | )= | 0.0000000E + 00 |
| dl( | 2.106009 | 0.7000000 | 25 | )= | 0.2440831 |
| dl( | 2.606009 | 0.7000000 | 25 | )= | 0.4881659 |
| dl( | 3.106009 | 0.7000000 | 25 | )= | 0.7322490 |
| dl( | 3.606009 | 0.7000000 | 25 | )= | 0.9763318 |
| dl( | 4.106009 | 0.7000000 | 25 | )= | 1.220415 |
| dl( | 4.606009 | 0.7000000 | 25 | )= | 1.464498 |
| dl( | 5.106009 | 0.7000000 | 25 | )= | 1.708581 |
| dl( | 5.606009 | 0.7000000 | 25 | )= | 1.952664 |
| dl( | 6.106009 | 0.7000000 | 25 | )= | 2.196746 |
| dl( | 6.606009 | 0.7000000 | 25 | )= | 2.440830 |
| gama(beta = 0.7000000 | | alfa = 30) > | | | 2.054056 |
| | gama | beta | alfa | | |
| dl( | 2.054056 | 0.7000000 | 30 | )= | 0.0000000E + 00 |
| dl( | 2.554056 | 0.7000000 | 30 | )= | 0.1660255 |
| dl( | 3.054056 | 0.7000000 | 30 | )= | 0.3320508 |
| dl( | 3.554056 | 0.7000000 | 30 | )= | 0.4980763 |
| dl( | 4.054056 | 0.7000000 | 30 | )= | 0.6641017 |
| dl( | 4.554056 | 0.7000000 | 30 | )= | 0.8301272 |
| dl( | 5.054056 | 0.7000000 | 30 | )= | 0.9961525 |
| dl( | 5.554056 | 0.7000000 | 30 | )= | 1.162178 |
| dl( | 6.054056 | 0.7000000 | 30 | )= | 1.328203 |
| dl( | 6.554056 | 0.7000000 | 30 | )= | 1.494229 |
| dl( | 7.054056 | 0.7000000 | 30 | )= | 1.660254 |
| gama(beta = 0.7000000 | | alfa = 35) > | | | 2.932765 |
| | gama | beta | alfa | | |
| dl( | 2.932765 | 0.7000000 | 35 | )= | 0.0000000E + 00 |
| dl( | 3.432765 | 0.7000000 | 35 | )= | 0.1038678 |
| dl( | 3.932765 | 0.7000000 | 35 | )= | 0.2077354 |
| dl( | 4.432765 | 0.7000000 | 35 | )= | 0.3116030 |
| dl( | 4.932765 | 0.7000000 | 35 | )= | 0.4154705 |
| dl( | 5.432765 | 0.7000000 | 35 | )= | 0.5193383 |
| dl( | 5.932765 | 0.7000000 | 35 | )= | 0.6232059 |
| dl( | 6.432765 | 0.7000000 | 35 | )= | 0.7270735 |
| dl( | 6.932765 | 0.7000000 | 35 | )= | 0.8309411 |
| dl( | 7.432765 | 0.7000000 | 35 | )= | 0.9348087 |
| dl( | 7.932765 | 0.7000000 | 35 | )= | 1.038677 |
| gama(beta = 0.7000000 | | alfa = 40) > | | | 5.379220 |
| | gama | beta | alfa | | |
| dl( | 5.379220 | 0.7000000 | 40 | )= | 0.0000000E + 00 |
| dl( | 5.879220 | 0.7000000 | 40 | )= | 5.1373534E − 02 |
| dl( | 6.379220 | 0.7000000 | 40 | )= | 0.1027469 |
| dl( | 6.879220 | 0.7000000 | 40 | )= | 0.1541205 |
| dl( | 7.379220 | 0.7000000 | 40 | )= | 0.2054938 |
| dl( | 7.879220 | 0.7000000 | 40 | )= | 0.2568674 |
| dl( | 8.379220 | 0.7000000 | 40 | )= | 0.3082408 |
| dl( | 8.879220 | 0.7000000 | 40 | )= | 0.3596143 |
| dl( | 9.379220 | 0.7000000 | 40 | )= | 0.4109877 |
| dl( | 9.879220 | 0.7000000 | 40 | )= | 0.4623612 |
| dl( | 10.37922 | 0.7000000 | 40 | )= | 0.5137346 |
| gama(beta = 0.7000000 | | alfa = 45) > | | | 50.24860 |
| | gama | beta | alfa | | |
| dl( | 50.24860 | 0.7000000 | 45 | )= | 0.0000000E + 00 |
| dl( | 50.74860 | 0.7000000 | 45 | )= | 5.0252676E − 03 |
| dl( | 51.24860 | 0.7000000 | 45 | )= | 1.0050535E − 02 |
| dl( | 51.74860 | 0.7000000 | 45 | )= | 1.5075803E − 02 |
| dl( | 52.24860 | 0.7000000 | 45 | )= | 2.0101070E − 02 |
| dl( | 52.74860 | 0.7000000 | 45 | )= | 2.5126338E − 02 |
| dl( | 53.24860 | 0.7000000 | 45 | )= | 3.0151606E − 02 |
| dl( | 53.74860 | 0.7000000 | 45 | )= | 3.5176873E − 02 |
| dl( | 54.24860 | 0.7000000 | 45 | )= | 4.0202141E − 02 |
| dl( | 54.74860 | 0.7000000 | 45 | )= | 4.5227408E − 02 |
| dl( | 55.24860 | 0.7000000 | 45 | )= | 5.0252676E − 02 |
| gama(beta = 0.8000000 | | alfa = 5) > | | | 1.030974 |
| | gama | beta | alfa | | |
| dl( | 1.030974 | 0.8000000 | 5 | )= | 0.0000000E + 00 |
| dl( | 1.530974 | 0.8000000 | 5 | )= | 1.125542 |
| dl( | 2.030974 | 0.8000000 | 5 | )= | 2.251082 |
| dl( | 2.530974 | 0.8000000 | 5 | )= | 3.376623 |

TABLE 1-continued

Design Parameters for CSSC Tube Fitting, $(d1 = \Delta L/Re_p)$.

| | gama | beta | alfa | | |
|---|---|---|---|---|---|
| dl( | 3.030974 | 0.8000000 | 5 | )= | 4.502163 |
| dl( | 3.530974 | 0.8000000 | 5 | )= | 5.627705 |
| dl( | 4.030974 | 0.8000000 | 5 | )= | 6.753245 |
| dl( | 4.530974 | 0.8000000 | 5 | )= | 7.878787 |
| dl( | 5.030974 | 0.8000000 | 5 | )= | 9.004327 |
| dl( | 5.530974 | 0.8000000 | 5 | )= | 10.12987 |
| dl( | 6.030974 | 0.8000000 | 5 | )= | 11.25541 | gama(beta = 0.8000000    alfa = 10) >    1.130530

| | gama | beta | alfa | | |
|---|---|---|---|---|---|
| dl( | 1.130530 | 0.8000000 | 10 | )= | 0.0000000E + 00 |
| dl( | 1.630530 | 0.8000000 | 10 | )= | 0.5321329 |
| dl( | 2.130530 | 0.8000000 | 10 | )= | 1.064265 |
| dl( | 2.630530 | 0.8000000 | 10 | )= | 1.596398 |
| dl( | 3.130530 | 0.8000000 | 10 | )= | 2.128531 |
| dl( | 3.630530 | 0.8000000 | 10 | )= | 2.660663 |
| dl( | 4.130530 | 0.8000000 | 10 | )= | 3.192796 |
| dl( | 4.630530 | 0.8000000 | 10 | )= | 3.724929 |
| dl( | 5.130530 | 0.8000000 | 10 | )= | 4.257061 |
| dl( | 5.630530 | 0.8000000 | 10 | )= | 4.789194 |
| dl( | 6.130530 | 0.8000000 | 10 | )= | 5.321326 | gama(beta = 0.8000000    alfa = 15) >    1.322975

| | gama | beta | alfa | | |
|---|---|---|---|---|---|
| dl( | 1.322975 | 0.8000000 | 15 | )= | 0.0000000E + 00 |
| dl( | 1.822975 | 0.8000000 | 15 | )= | 0.3205443 |
| dl( | 2.322975 | 0.8000000 | 15 | )= | 0.6410881 |
| dl( | 2.822975 | 0.8000000 | 15 | )= | 0.9616324 |
| dl( | 3.322975 | 0.8000000 | 15 | )= | 1.282176 |
| dl( | 3.822975 | 0.8000000 | 15 | )= | 1.602720 |
| dl( | 4.322975 | 0.8000000 | 15 | )= | 1.923264 |
| dl( | 4.822975 | 0.8000000 | 15 | )= | 2.243809 |
| dl( | 5.322975 | 0.8000000 | 15 | )= | 2.564352 |
| dl( | 5.822975 | 0.8000000 | 15 | )= | 2.884897 |
| dl( | 6.322975 | 0.8000000 | 15 | )= | 3.205441 | gama(beta = 0.8000000    alfa = 20) >    1.669916

| | gama | beta | alfa | | |
|---|---|---|---|---|---|
| dl( | 1.669916 | 0.8000000 | 20 | )= | 0.0000000E + 00 |
| dl( | 2.169916 | 0.8000000 | 20 | )= | 0.2042170 |
| dl( | 2.669916 | 0.8000000 | 20 | )= | 0.4084340 |
| dl( | 3.169916 | 0.8000000 | 20 | )= | 0.6126506 |
| dl( | 3.669916 | 0.8000000 | 20 | )= | 0.8168676 |
| dl( | 4.169916 | 0.8000000 | 20 | )= | 1.021085 |
| dl( | 4.669916 | 0.8000000 | 20 | )= | 1.225302 |
| dl( | 5.169916 | 0.8000000 | 20 | )= | 1.429518 |
| dl( | 5.669916 | 0.8000000 | 20 | )= | 1.633735 |
| dl( | 6.169916 | 0.8000000 | 20 | )= | 1.837952 |
| dl( | 6.669916 | 0.8000000 | 20 | )= | 2.042169 | gama(beta = 0.8000000    alfa = 25) >    2.344067

| | gama | beta | alfa | | |
|---|---|---|---|---|---|
| dl( | 2.344067 | 0.8000000 | 25 | )= | 0.0000000E + 00 |
| dl( | 2.844067 | 0.8000000 | 25 | )= | 0.1257728 |
| dl( | 3.344067 | 0.8000000 | 25 | )= | 0.2515459 |
| dl( | 3.844067 | 0.8000000 | 25 | )= | 0.3773187 |
| dl( | 4.344068 | 0.8000000 | 25 | )= | 0.5030918 |
| dl( | 4.844068 | 0.8000000 | 25 | )= | 0.6288645 |
| dl( | 5.344068 | 0.8000000 | 25 | )= | 0.7546374 |
| dl( | 5.844068 | 0.8000000 | 25 | )= | 0.8804101 |
| dl( | 6.344068 | 0.8000000 | 25 | )= | 1.006183 |
| dl( | 6.844068 | 0.8000000 | 25 | )= | 1.131956 |
| dl( | 7.344068 | 0.8000000 | 25 | )= | 1.257729 | gama(beta = 0.8000000    alfa = 30) >    4.029140

| | gama | beta | alfa | | |
|---|---|---|---|---|---|
| dl( | 4.029140 | 0.8000000 | 30 | )= | 0.0000000E + 00 |
| dl( | 4.529140 | 0.8000000 | 30 | )= | 6.6025421E - 02 |
| dl( | 5.029140 | 0.8000000 | 30 | )= | 0.1320508 |
| dl( | 5.529140 | 0.8000000 | 30 | )= | 0.1980761 |
| dl( | 6.029140 | 0.8000000 | 30 | )= | 0.2641015 |
| dl( | 6.529140 | 0.8000000 | 30 | )= | 0.3301269 |
| dl( | 7.029140 | 0.8000000 | 30 | )= | 0.3961523 |
| dl( | 7.529140 | 0.8000000 | 30 | )= | 0.4621775 |
| dl( | 8.029140 | 0.8000000 | 30 | )= | 0.5282030 |
| dl( | 8.529140 | 0.8000000 | 30 | )= | 0.5942284 |
| dl( | 9.029140 | 0.8000000 | 30 | )= | 0.6602538 | gama(beta = 0.8000000    alfa = 35) >    14.74223

| | gama | beta | alfa | | |
|---|---|---|---|---|---|
| dl( | 14.74223 | 0.8000000 | 35 | )= | 0.0000000E + 00 |
| dl( | 15.24223 | 0.8000000 | 35 | )= | 1.6695250E - 02 |
| dl( | 15.74223 | 0.8000000 | 35 | )= | 3.3390671E - 02 |
| dl( | 16.24223 | 0.8000000 | 35 | )= | 5.0085921E - 02 |
| dl( | 16.74223 | 0.8000000 | 35 | )= | 6.6781171E - 02 |
| dl( | 17.24223 | 0.8000000 | 35 | )= | 8.3476588E - 02 |
| dl( | 17.74223 | 0.8000000 | 35 | )= | 0.1001718 |
| dl( | 18.24223 | 0.8000000 | 35 | )= | 0.1168671 |
| dl( | 18.74223 | 0.8000000 | 35 | )= | 0.1335623 |
| dl( | 19.24223 | 0.8000000 | 35 | )= | 0.1502578 |
| dl( | 19.74223 | 0.8000000 | 35 | )= | 0.1669530 | gama(beta = 0.9000000    alfa = 5) >    1.071069

| | gama | beta | alfa | | |
|---|---|---|---|---|---|
| dl( | 1.071069 | 0.9000000 | 5 | )= | 0.0000000E + 00 |
| dl( | 1.571069 | 0.9000000 | 5 | )= | 0.5518552 |
| dl( | 2.071069 | 0.9000000 | 5 | )= | 1.103712 |
| dl( | 2.571069 | 0.9000000 | 5 | )= | 1.655567 |
| dl( | 3.071069 | 0.9000000 | 5 | )= | 2.207422 |
| dl( | 3.571069 | 0.9000000 | 5 | )= | 2.759278 |
| dl( | 4.071069 | 0.9000000 | 5 | )= | 3.311134 |
| dl( | 4.571069 | 0.9000000 | 5 | )= | 3.862989 |
| dl( | 5.071069 | 0.9000000 | 5 | )= | 4.414845 |
| dl( | 5.571069 | 0.9000000 | 5 | )= | 4.966701 |
| dl( | 6.071069 | 0.9000000 | 5 | )= | 5.518556 | gama(beta = 0.9000000    alfa = 10) >    1.319999

| | gama | beta | alfa | | |
|---|---|---|---|---|---|
| dl( | 1.319999 | 0.9000000 | 10 | )= | 0.0000000E + 00 |
| dl( | 1.819999 | 0.9000000 | 10 | )= | 0.2441943 |
| dl( | 2.319999 | 0.9000000 | 10 | )= | 0.4883885 |
| dl( | 2.819999 | 0.9000000 | 10 | )= | 0.7325828 |
| dl( | 3.319999 | 0.9000000 | 10 | )= | 0.9767771 |
| dl( | 3.819999 | 0.9000000 | 10 | )= | 1.220971 |
| dl( | 4.319999 | 0.9000000 | 10 | )= | 1.465166 |
| dl( | 4.819999 | 0.9000000 | 10 | )= | 1.709360 |
| dl( | 5.319999 | 0.9000000 | 10 | )= | 1.953554 |
| dl( | 5.819999 | 0.9000000 | 10 | )= | 2.197748 |
| dl( | 6.319999 | 0.9000000 | 10 | )= | 2.441943 | gama(beta = 0.9000000    alfa = 15) >    1.914492

| | gama | beta | alfa | | |
|---|---|---|---|---|---|
| dl( | 1.914492 | 0.9000000 | 15 | )= | 0.0000000E + 00 |
| dl( | 2.414492 | 0.9000000 | 15 | )= | 0.1273588 |
| dl( | 2.914492 | 0.9000000 | 15 | )= | 0.2547180 |
| dl( | 3.414492 | 0.9000000 | 15 | )= | 0.3820768 |
| dl( | 3.914492 | 0.9000000 | 15 | )= | 0.5094356 |
| dl( | 4.414492 | 0.9000000 | 15 | )= | 0.6367944 |
| dl( | 4.914492 | 0.9000000 | 15 | )= | 0.7641537 |
| dl( | 5.414492 | 0.9000000 | 15 | )= | 0.8915125 |
| dl( | 5.914492 | 0.9000000 | 15 | )= | 1.018871 |
| dl( | 6.414492 | 0.9000000 | 15 | )= | 1.146230 |
| dl( | 6.914492 | 0.9000000 | 15 | )= | 1.273589 | gama(beta = 0.9000000    alfa = 20) >    3.652381

| | gama | beta | alfa | | |
|---|---|---|---|---|---|
| dl( | 3.652381 | 0.9000000 | 20 | )= | 0.0000000E + 00 |
| dl( | 4.152381 | 0.9000000 | 20 | )= | 5.8026921E - 02 |
| dl( | 4.652381 | 0.9000000 | 20 | )= | 0.1160535 |
| dl( | 5.152381 | 0.9000000 | 20 | )= | 0.1740804 |
| dl( | 5.652381 | 0.9000000 | 20 | )= | 0.2321070 |
| dl( | 6.152381 | 0.9000000 | 20 | )= | 0.2901340 |
| dl( | 6.652381 | 0.9000000 | 20 | )= | 0.3481605 |
| dl( | 7.152381 | 0.9000000 | 20 | )= | 0.4061875 |
| dl( | 7.652381 | 0.9000000 | 20 | )= | 0.4642141 |
| dl( | 8.152381 | 0.9000000 | 20 | )= | 0.5222410 |
| dl( | 8.652381 | 0.9000000 | 20 | )= | 0.5802675 | gama(beta = 0.9000000    alfa = 25) >    26.48351

| | gama | beta | alfa | | |
|---|---|---|---|---|---|
| dl( | 26.48351 | 0.9000000 | 25 | )= | 0.0000000E + 00 |
| dl( | 26.98351 | 0.9000000 | 25 | )= | 7.4627930E - 03 |
| dl( | 27.48351 | 0.9000000 | 25 | )= | 1.4925586E - 02 |
| dl( | 27.98351 | 0.9000000 | 25 | )= | 2.2388378E - 02 |
| dl( | 28.48351 | 0.9000000 | 25 | )= | 2.9851172E - 02 |
| dl( | 28.98351 | 0.9000000 | 25 | )= | 3.7313964E - 02 |
| dl( | 29.48351 | 0.9000000 | 25 | )= | 4.4776756E - 02 |
| dl( | 29.98351 | 0.9000000 | 25 | )= | 5.2239552E - 02 |
| dl( | 30.48351 | 0.9000000 | 25 | )= | 5.9702344E - 02 |
| dl( | 30.98351 | 0.9000000 | 25 | )= | 6.7165136E - 02 |
| dl( | 31.48351 | 0.9000000 | 25 | )= | 7.4627928E - 02 *Z |

I claim:

1. A method of creating a seal that is effective across a range of temperatures, including cryogenic temperatures, comprising the steps of:
   a) selecting a sealing spacer having a desired coefficient of thermal expansion and tube ends having different coefficients of thermal expansion therefrom, said spacer and said tube ends also having shapes complementary to each other such that when said tube ends are brought into contact with said spacer, a sealed sloped engagement results yielding sloped-surface sealing; and
   b) placing said spacer in contact with said tube ends such that a sealed sloped engagement yielding sloped-surface sealing is accomplished that maintains the seal across a range of various temperatures, including cryogenic temperatures.

2. The method according to claim 1, wherein said sealing spacer is placed in contact with said tube ends by using a housing nut.

3. The method according to claim 2, wherein said housing nut, during cooling, contracts and thereby forces said tube ends toward each other, thereby maintaining the seal various temperatures, including cryogenic temperatures.

4. The method according to claim 3, wherein said housing nut has a larger coefficient of thermal expansion than said tube ends.

5. A method of joining tube ends to provide an effective seal across a range of temperatures, including cryogenic temperatures, wherein said tube ends each have a sloped contact surface, said method comprising the steps of
   a) selecting a sealing spacer having a larger coefficient of thermal expansion than said tube ends, and a shape complementary thereto; and
   b) placing said sealing spacer in contact with each said sloped contact surface so that during cooling, as said sealing spacer contracts, a sealed engagement with each of said sloped contact surfaces yielding sloped-surface sealing is maintained.

6. The method according to claim 5, wherein each of said sloped contact surfaces is on an outer portion of each of said tube ends.

7. The method according to claim 6, wherein said sealing spacer is placed in contact with said sloped contact surfaces by using a housing nut.

8. The method according to claim 7, wherein said housing nut, during cooling, contracts and thereby forces said tube ends toward each other, thereby maintaining the formation and maintenance of a leak-free seal at various temperatures, including cryogenic temperatures.

9. The method according to claim 8, wherein said housing nut has a larger coefficient of thermal expansion than said tube ends.

10. The method according to claim 5, wherein said sealing spacer is placed in contact with said sloped contact surfaces by using a housing nut.

11. The method according to claim 10, wherein said housing nut, during cooling, contracts and thereby forces said tube ends toward each other, thereby maintaining the formation and maintenance of a leak-free seal at various temperatures, including cryogenic temperatures.

12. The method according to claim 11, wherein said housing nut has a larger coefficient of thermal expansion than said tube ends.

13. A cryogenic tube seal comprising a first coupling member having a first sloped contact surface on an outer portion of said member; a second coupling member having a second sloped contact surface on an outer portion of said member; and sealing means for establishing and maintaining sloped-surface sealing between said coupling members at cryogenic temperatures at least as low as about 77K without resulting in inelastic deformation of either of said sloped contact surfaces or said sealing means.

14. The cryogenic tube seal, according to claim 13, wherein said sealing means comprises a sealing spacer having a greater coefficient of thermal expansion than each of said coupling members, wherein said sealing spacer contacts said first contact surface and said second contact surface, and wherein said sealing means also comprises a housing nut selectively engaged with said first coupling member and said second coupling member, wherein said housing nut has a greater coefficient of thermal expansion than each of said coupling members.

15. The seal, according to claim 14, wherein said sealing spacer is an O-ring spacer.

* * * * *

UNITED STATES PATENT AND TRADEMARK OFFICE
CERTIFICATE OF CORRECTION

PATENT NO. : 5,628,517

DATED : May 13, 1997

INVENTOR(S) : Hall *et al.*

It is certified that error appears in the above-indentified patent and that said Letters Patent is hereby corrected as shown below:

Column 1: line 40: "ting" should read --ring--; line 41: "ting" should read --ring--.

Column 3: line 48: "a housing nut.." should read --a housing nut.--

Column 5: line 17: "tube end :12 into" should read --tube end 22 into--;

line 54: "$[\alpha + O \tan^{-1} (...$" should read --$[\alpha + \tan^{-1} (...$--.

Column 6: line 46: "and $\Delta\tau' = \Delta L'$ tana," should read --and $\Delta\tau' = \Delta L' \tan\alpha$,--;

line 54: "where $\Delta r = r_1 r_2$" should read --where $\Delta r = r_1 - r_2$;

lines 65&55: "where $\epsilon$ and $\epsilon_p$ are" should read --where $\epsilon_o$ and $\epsilon_p$ are--.

Column 7: line 6: "Let $\gamma = \epsilon_o/\epsilon_p$, and $\beta = 4_1/R$," should read --Let $\gamma = \epsilon_o/\epsilon_p$, and $\beta = r_1/R$,--.

Column 27: line 23: "the seal various" should read --the seal at various--.

Signed and Sealed this

Nineteenth Day of August, 1997

*Attest:*

BRUCE LEHMAN

*Attesting Officer*   *Commissioner of Patents and Trademarks*